United States Patent
Yu

(10) Patent No.: US 10,945,193 B2
(45) Date of Patent: Mar. 9, 2021

(54) CONGESTION CONTROL IN A NETWORK

(71) Applicant: Huawei Technologies Co., Ltd., Shenzhen (CN)

(72) Inventor: Yijun Yu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/427,003

(22) Filed: May 30, 2019

(65) Prior Publication Data

US 2019/0281532 A1 Sep. 12, 2019

Related U.S. Application Data

(63) Continuation of application No. 14/879,300, filed on Oct. 9, 2015, now Pat. No. 10,334,505, which is a
(Continued)

(51) Int. Cl.
*H04W 48/06* (2009.01)
*H04W 76/18* (2018.01)
*H04L 12/26* (2006.01)

(52) U.S. Cl.
CPC .......... *H04W 48/06* (2013.01); *H04L 43/062* (2013.01); *H04W 76/18* (2018.02)

(58) Field of Classification Search
None
See application file for complete search history.

(56) References Cited

U.S. PATENT DOCUMENTS

| 9,046,370 | B2 | 6/2015 | Annapureddy et al. | |
| 2007/0129081 | A1* | 6/2007 | Seo | H04W 28/10 455/453 |

(Continued)

FOREIGN PATENT DOCUMENTS

| CN | 102333343 A | 1/2012 |
| CN | 102421141 A | 4/2012 |

(Continued)

OTHER PUBLICATIONS

"3rd Generation Partnership Project; Technical Specification Group Services and System Aspects; General Packet Radio Service (GPRS) enhancements for Evolved Universal Terrestrial Radio Access Network (E-UTRAN) access (Release 12)," 3GPP TS 23.401, V12.0.0, pp. 1-290, 3rd Generation Partnership Project, Valbonne, France, (Mar. 2013).

(Continued)

*Primary Examiner* — Anh Ngoc M Nguyen
(74) *Attorney, Agent, or Firm* — Leydig, Voit & Mayer, Ltd.

(57) ABSTRACT

The present invention provides a congestion control method and apparatus. The method includes: sending, by a user equipment, a first network connection request to a network device of a first mobile network; receiving, by the user equipment, a first network connection rejection message from the network device, where the first network connection rejection message includes network switching indication information, where the network switching indication information is used for instructing the user equipment to switch to a second mobile network, and the network switching indication information is from a subscription manager SM; and accessing, by the user equipment, the second mobile network according to the network switching indication information. The present invention ensures normal execution of a service on an eUICC user equipment when network congestion occurs.

12 Claims, 10 Drawing Sheets

Related U.S. Application Data continuation of application No. PCT/CN2013/074071, filed on Apr. 11, 2013.

(56) References Cited

U.S. PATENT DOCUMENTS

| | | |
|---|---|---|
| 2008/0026760 A1 | 1/2008 | Park et al. |
| 2011/0171926 A1 | 7/2011 | Faccin et al. |
| 2012/0094669 A1 | 4/2012 | Hapsari et al. |
| 2012/0207023 A1 | 8/2012 | Tsuda |
| 2012/0289151 A1 | 11/2012 | Wu |
| 2015/0045032 A1 | 2/2015 | Tomici et al. |
| 2015/0055494 A1 | 2/2015 | Zhou et al. |

FOREIGN PATENT DOCUMENTS

| | | |
|---|---|---|
| CN | 102625412 A | 8/2012 |
| CN | 102638865 A | 8/2012 |
| WO | 2012110002 A1 | 8/2012 |
| WO | WO-2013050070 A1 * | 4/2013 ............. H04L 45/28 |

OTHER PUBLICATIONS

Extended European Search Report dated Feb. 22, 2016 in corresponding European Patent Application No. 13881649.1.

European Search Report dated Jun. 8, 2017 in corresponding European Patent Application No. 13881649.1.

"ESM back-off timers for multiple congested APNs," 3GPP Draft; CI-111073_24.30I_ESM Back-off timer for multiple congested APNs, vol. CTWGI, XP050480495, 3rd Generation Partnership Project , Valbonne, France (Feb. 14, 2011).

"An enhancement of overload control for MTC Devices with multiple PDN connections," 3GPP Draft; S2-103189, vol. SA WG2, XP050458268, 3rd Generation Partnership Project, Valbonne, France (Jun. 29, 2010).

International Search Report dated Jan. 23, 2014 in corresponding international application PCT/CN2013/074071.

* cited by examiner

CONGESTION CONTROL IN A NETWORK

CROSS-REFERENCE TO RELATED APPLICATIONS

This application is a continuation of U.S. patent application Ser. No. 14/879,300, filed on Oct. 9, 2015, which is a continuation of International Application No. PCT/CN2013/074071, filed on Apr. 11, 2013. All of the afore-mentioned patent applications are hereby incorporated by reference in their entireties.

TECHNICAL FIELD

The present invention relates to communications technologies, and in particular, to a congestion control method and apparatus.

BACKGROUND

A mobile communications technology is used for supporting a user equipment (UE) in accessing the Internet through a wireless network. In order to access the wireless network, a UE first needs to be registered with an operator to obtain a legitimate subscriber identity module (SIM) card, and then the SIM card is placed into the UE. The SIM card is a typical universal integrated circuit card (UICC) and includes subscription information of the operator. The UE uses the subscription information provided by the SIM card for network registration. SIM cards are gradually applied in the field of machine communications (for example, field data acquisition) and used for wireless network access and interaction with a service server in machine communications. However, because a device for machine communications is stationary after installation, for example, in a remote area, it is also difficult to change a SIM card after the SIM card is placed into a user equipment, and when a service provider needs to change an operator, it needs a large cost to change the SIM card in the user equipment, which brings about many difficulties in deploying a machine communications service. In order to solve the foregoing problem, the prior art provides a new-type UICC technology, that is, an embedded UICC (eUICC). The eUICC technology allows dynamic update of operator information in a UICC, that is, an operator can be changed without a need of removing a UICC from a user equipment.

When the UE into which an eUICC is placed accesses a wireless network, congestion may occur in the wireless network, for example, a device in the network is overloaded, or a UE consumes excessive network resources. To handle this situation, the prior art supports a congestion control method, in which when network congestion occurs, the network rejects access of a new user equipment and sets a limitation that a rejected user equipment cannot initiate an attach request or other service requests including a request to the network or another network within a time period (for example, 30 minutes). However, this method does not consider a feature and a requirement of a service running on a user equipment. If a service that is being executed or is to be executed by a current user equipment has a requirement for real time, for example, a medical device reports a condition of a patient, or a vehicle-mounted electronic device obtains surroundings information for navigation, and if the foregoing congestion control technology is used to prevent the user equipment from accessing a network in a time period, and the service cannot be executed properly and even a serious consequence is caused.

SUMMARY

The present invention provides a congestion control method and apparatus, to ensure normal execution of a service on a user equipment with an eUICC when network congestion occurs.

According to a first aspect, a congestion control method is provided, including:

sending, by a user equipment, a first network connection request to a network device of a first mobile network;

receiving, by the user equipment, a first network connection rejection message from the network device, where the first network connection rejection message includes network switching indication information, where the network switching indication information is used for instructing the user equipment to switch to a second mobile network, and the network switching indication information is from a subscription manager SM; and accessing, by the user equipment, the second mobile network according to the network switching indication information.

With reference to the first aspect, in a first possible implementation manner, the first network connection request is an attach request, and the first network connection rejection message is an attach reject; or the first network connection request is a PDN connectivity request, and the first network connection rejection message is a PDN connectivity reject message.

With reference to the first aspect or the first possible implementation manner of the first aspect, in a second possible implementation manner, the network switching indication information is sent after the subscription manager SM receives congestion state information from the first mobile network and determines that the UE needs to perform network switching.

With reference to the second possible implementation manner of the first aspect, in a third possible implementation manner, the congestion state information includes information indicating that the first mobile network is congested, and an identifier of the user equipment, or an APN used by the user equipment, or an identifier of a service requested by the user equipment.

With reference to any one of the first aspect to the third possible implementation manner of the first aspect, in a fourth possible implementation manner, the first network connection rejection message further includes second mobile network information corresponding to the second mobile network; the accessing the second mobile network includes: accessing the second mobile network according to the second mobile network information; and the second mobile network information includes at least one of a mobile network type, a mobile network identifier, and a mobile network index, where the mobile network index is used for indicating the mobile network type and/or the mobile network identifier stored in the user equipment.

According to a second aspect, a congestion control method is provided, including:

receiving, by a subscription manager SM, congestion state information sent by a network device of a first mobile network, where the congestion state information is used for indicating that the first mobile network is congested, and the congestion state information includes information of a user equipment;

determining, by the SM according to the congestion state information, that the user equipment meets a network switching condition; and sending, by the SM, network switching indication information to the network device, where the network switching indication information is used for instructing the user equipment to access a second mobile network.

With reference to the second aspect, in a first possible implementation manner, the information of the user equipment includes at least one of an identifier of the user equipment, an APN used by the user equipment, and an identifier of a service requested by the user equipment.

With reference to the second aspect or the first possible implementation manner of the second aspect, in a second possible implementation manner, the network switching condition includes at least one of a list of identifiers of user equipments which need to perform network switching, a list of APNs used by user equipments which need to perform network switching, and a list of identifiers of services requested by user equipments which need to perform network switching.

With reference to any one of the second aspect to the second possible implementation manner of the second aspect, in a third possible implementation manner, the SM sends a congestion reporting indication to the network device, where the congestion reporting indication is used for instructing the first mobile network to send, when the first mobile network is congested, the congestion state information.

With reference to the third possible implementation manner of the second aspect, in a fourth possible implementation manner, the congestion reporting indication includes a congestion reporting condition.

With reference to the fourth possible implementation manner of the second aspect, in a fifth possible implementation manner, the congestion reporting condition includes at least one of a list of user equipment identifiers which needs to be reported when congestion occurs, a list of APNs used by user equipments which needs to be reported when congestion occurs, and a list of identifiers of services requested by user equipments which needs to be reported when congestion occurs.

With reference to any one of the second aspect to the fifth possible implementation manner of the second aspect, in a sixth possible implementation manner, the SM communicates with a home subscription server of the second mobile network, to activate subscription data, in the second mobile network, of the user equipment.

With reference to any one of the second aspect to the sixth possible implementation manner of the second aspect, in a seventh possible implementation manner, the network switching indication information includes information of the second mobile network.

With reference to the seventh possible implementation manner of the second aspect, in an eighth implementation manner, the information of the second mobile network includes at least one of a mobile network type, a mobile network identifier, and a mobile network index, where the mobile network index is used for indicating the mobile network type and/or the mobile network identifier stored in the user equipment.

According to a third aspect, a congestion control method is provided, including:

sending, by a network device of a first mobile network, congestion state information to a subscription manager SM, where the congestion state information is used for indicating that the first mobile network is congested, and the congestion state information includes information of a user equipment UE; and receiving, by the network device, network switching indication information from the SM, where the network switching indication information is used for instructing the user equipment to access a second mobile network.

With reference to the third aspect, in a first possible implementation manner, the information of the UE includes at least one of an identifier of the UE, an APN used by the UE, and an identifier of a service requested by the UE.

With reference to the third aspect or the first possible implementation manner of the third aspect, in a second possible implementation manner, the method further includes: receiving, by the network device, a congestion reporting indication from the SM, where the congestion reporting indication is used for instructing the first mobile network to send, when the first mobile network is congested, the congestion state information.

With reference to the second possible implementation manner of the third aspect, in a third possible implementation manner, the congestion reporting indication includes a congestion reporting condition, and the user equipment meets the congestion reporting condition.

With reference to the third possible implementation manner of the third aspect, in a fourth possible implementation manner, that the user equipment meets the congestion reporting condition includes that the identifier of the user equipment is in a user equipment identifier list which is included in the congestion reporting condition and needs to be reported; or the APN used by the user equipment is in an APN list which is included in the congestion reporting condition and needs to be reported; or the identifier of the service requested by the user equipment is in a service identifier list which is included in the congestion reporting condition and needs to be reported.

With reference to any one of the third aspect to the fourth possible implementation manner of the third aspect, in a fifth possible implementation manner, the network device includes an HSS or an HLR.

With reference to the fifth possible implementation manner of the third aspect, in a sixth possible implementation manner, the method further includes: receiving, by the HSS or the HLR, congestion indication information sent by a mobility management entity MME of the first mobile network, where the congestion state information is sent after the congestion indication information sent by the MME is received, and the congestion state information is used for indicating that the MME in the first mobile network is congested; and sending, by the HSS or the HLR, the network switching indication information to the MME.

With reference to the sixth possible implementation manner of the third aspect, in a seventh possible implementation manner, the method further includes: sending, by the HSS or the HLR, a congestion reporting indication to the mobility management entity MME of the first mobile network, where the reporting indication is used for instructing the MME to send, when the first mobile network is congested, congestion state information; and receiving, by the HSS or the HLR, the congestion state information sent by the MME, where the congestion state information indicates that the MME is congested or an SGW is congested or a PGW is congested.

With reference to any one of the third aspect to the fourth possible implementation manner of the third aspect, in an eighth possible implementation manner, the network device includes a PGW or an SGW.

With reference to the eighth possible implementation manner of the third aspect, in a ninth possible implementation manner, the PGW/SGW receives, through an HSS/HLR and an MME, the congestion reporting indication sent by the SM, or the congestion reporting indication is received by the PGW or the SGW directly from the SM; and the method further includes: sending, by the PGW/SGW, the network switching indication information to the MME.

With reference to the ninth possible implementation manner of the third aspect, in a tenth possible implementation manner, the congestion state information indicates that the PGW or the SGW is congested.

With reference to any one of the third aspect to the fourth possible implementation manner of the third aspect, in an eleventh possible implementation manner, the network device is a mobility management entity MME.

With reference to the eleventh possible implementation manner of the third aspect, in a twelfth possible implementation manner, the method further includes: receiving, by the MME, a first network connection request from the UE; and sending, by the MME, a first network connection rejection message including the network switching indication information to the UE.

With reference to the eleventh possible implementation manner of the third aspect, in a thirteenth possible implementation manner, the first network connection request is an attach request, and the first network connection rejection message is an attach reject; or the first network connection request is a PDN connectivity request, and the first network connection rejection message is a PDN connectivity reject message.

With reference to any one of the eleventh possible implementation manner to the thirteenth possible implementation manner of the third aspect, in a fourteenth possible implementation manner, the MME receives, through an HSS/HLR, the congestion reporting indication sent by the SM; and the congestion state information is sent to the SM through the HLR/HSS.

With reference to any one of the eleventh possible implementation manner to the thirteenth possible implementation manner of the third aspect, in a fifteenth possible implementation manner, the congestion state information indicates that the MME is congested.

With reference to the thirteenth possible implementation manner of the third aspect, in a sixteenth possible implementation manner, the method further includes: receiving, by the MME, a congestion notification from an SGW, where the congestion state information indicates that the SGW or a PGW is congested.

With reference to any one of the third aspect to the sixteenth possible implementation manner of the third aspect, in a seventeenth possible implementation manner, the network switching indication information includes information of the second mobile network.

With reference to the seventeenth possible implementation manner of the third aspect, in an eighteenth possible implementation manner, the information of the second mobile network includes at least one of a mobile network type, a mobile network identifier, and a mobile network index, where the mobile network index is used for indicating the mobile network type and/or the mobile network identifier stored in the user equipment.

According to a fourth aspect, a user equipment is provided, including:

a request sending unit, configured to send a first network connection request to a network device of a first mobile network;

an information receiving unit, configured to receive a first network connection rejection message from the network device, where the first network connection rejection message includes network switching indication information, where the network switching indication information is used for instructing the user equipment to switch to a second mobile network, and the network switching indication information is from a subscription manager SM; and a network access unit, configured to access the second mobile network according to the network switching indication information.

With reference to the fourth aspect, in a first possible implementation manner, the first network connection request sent by the request sending unit is an attach request, and the first network connection rejection message received by the information receiving unit is an attach reject; or the first network connection request sent by the request sending unit is a PDN connectivity request, and the first network connection rejection message received by the information receiving unit is a PDN connectivity reject message.

With reference to the fourth aspect or the first possible implementation manner of the fourth aspect, in a second possible implementation manner, the network switching indication information received by the information receiving unit is sent after the subscription manager SM receives congestion state information from the first mobile network and determines that the UE needs to perform network switching.

With reference to the second possible implementation manner of the fourth aspect, in a third possible implementation manner, the congestion state information includes information indicating that the first mobile network is congested, and an identifier of the user equipment, or an APN used by the user equipment, or an identifier of a service requested by the user equipment.

With reference to any one of the fourth aspect to the third possible implementation manner of the fourth aspect, in a fourth possible implementation manner, the first network connection rejection message received by the information receiving unit further includes second mobile network information corresponding to the second mobile network; the accessing the second mobile network includes: accessing the second mobile network according to the second mobile network information; and the second mobile network information includes at least one of a mobile network type, a mobile network identifier, and a mobile network index, where the mobile network index is used for indicating the mobile network type and/or the mobile network identifier stored in the user equipment.

According to a fifth aspect, a subscription manager SM is provided, including:

an information receiving unit, configured to receive congestion state information sent by a network device of a first mobile network, where the congestion state information is used for indicating that the first mobile network is congested, and the congestion state information includes information of a user equipment;

a condition determining unit, configured to determine, according to the congestion state information, that the user equipment meets a network switching condition; and an indication sending unit, configured to send network switching indication information to the network device, where the network switching indication information is used for instructing the user equipment to access a second mobile network.

With reference to the fifth aspect, in a first possible implementation manner, the information of the user equipment received by the information receiving unit includes at least one of an identifier of the user equipment, an APN used by the user equipment, and an identifier of a service requested by the user equipment.

With reference to the fifth aspect or the first possible implementation manner of the fifth aspect, in a second possible implementation manner, the network switching condition used by the condition determining unit for determining includes at least one of a list of identifiers of user equipments which need to perform network switching, a list of APNs used by user equipments which need to perform network switching, and a list of identifiers of services requested by user equipments which need to perform network switching.

With reference to any one of the fifth aspect to the second possible implementation manner of the fifth aspect, in a third possible implementation manner, the indication sending unit is further configured to send a congestion reporting indication to the network device, where the congestion reporting indication is used for instructing the first mobile network to send, when the first mobile network is congested, the congestion state information.

With reference to the third possible implementation manner of the fifth aspect, in a fourth possible implementation manner, the congestion reporting indication includes a congestion reporting condition.

With reference to the fourth possible implementation manner of the fifth aspect, in a fifth possible implementation manner, the congestion reporting condition includes at least one of a list of user equipment identifiers which needs to be reported when congestion occurs, a list of APNs used by user equipments which needs to be reported when congestion occurs, and a list of identifiers of services requested by user equipments which needs to be reported when congestion occurs.

With reference to any one of the fifth aspect to the fifth possible implementation manner of the fifth aspect, in a sixth possible implementation manner, the subscription manager SM further includes a communication management unit, configured to communicate with a home subscription server of the second mobile network, to activate subscription data, in the second mobile network, of the user equipment.

With reference to any one of the fifth aspect to the sixth possible implementation manner of the fifth aspect, in a seventh possible implementation manner, the network switching indication information sent by the indication sending unit includes information of the second mobile network.

With reference to the seventh possible implementation manner of the fifth aspect, in an eighth possible implementation manner, the information of the second mobile network includes at least one of a mobile network type, a mobile network identifier, and a mobile network index, where the mobile network index is used for indicating the mobile network type and/or the mobile network identifier stored in the user equipment.

According to a sixth aspect, a network device is provided, including:

an information sending unit, configured to send congestion state information to a subscription manager SM, where the congestion state information is used for indicating that the first mobile network in which the network device is located is congested, and the congestion state information includes information of a user equipment UE; and an indication receiving unit, configured to receive network switching indication information from the SM, where the network switching indication information is used for instructing the user equipment to access a second mobile network.

With reference to the sixth aspect, in a first possible implementation manner, the information of the UE sent by the information sending unit includes at least one of an identifier of the UE, an APN used by the UE, and an identifier of a service requested by the UE.

With reference to the sixth aspect or the first possible implementation manner of the sixth aspect, in a second possible implementation manner, the indication receiving unit is further configured to receive a congestion reporting indication from the SM, where the congestion reporting indication is used for instructing the first mobile network to send, when the first mobile network is congested, the congestion state information.

With reference to the first possible implementation manner of the sixth aspect, in a third possible implementation manner, the congestion reporting indication includes a congestion reporting condition, and the user equipment meets the congestion reporting condition.

With reference to the second possible implementation manner of the sixth aspect, in a fourth possible implementation manner, that the user equipment meets the congestion reporting condition includes that the identifier of the user equipment is in a user equipment identifier list which is included in the congestion reporting condition and needs to be reported; or the APN used by the user equipment is in an APN list which is included in the congestion reporting condition and needs to be reported; or the identifier of the service requested by the user equipment is in a service identifier list which is included in the congestion reporting condition and needs to be reported.

With reference to any one of the sixth aspect to the fourth possible implementation manner of the sixth aspect, in a fifth possible implementation manner, the network device includes an HSS or an HLR.

With reference to the fifth possible implementation manner of the sixth aspect, in a sixth possible implementation manner, the network device further includes: an information receiving unit, configured to receive congestion indication information sent by a mobility management entity MME of the first mobile network, where the congestion state information is sent after the congestion indication information sent by the MME is received, and the congestion state information is used for indicating that the MME in the first mobile network is congested; and an indication sending unit, configured to send the network switching indication information to the MME.

With reference to the sixth possible implementation manner of the sixth aspect, in a seventh possible implementation manner, the indication sending unit is further configured to send a congestion reporting indication to the mobility management entity MME of the first mobile network, where the reporting indication is used for instructing the MME to send, when the first mobile network is congested, congestion state information; and the information receiving unit is further configured to receive the congestion state information sent by the MME, where the congestion state information indicates that the MME is congested or an SGW is congested or a PGW is congested.

With reference to any one of the sixth aspect to the fourth possible implementation manner of the sixth aspect, in an eighth possible implementation manner, the network device includes a PGW or an SGW.

With reference to the eighth possible implementation manner of the sixth aspect, in a ninth possible implementation manner, the indication receiving unit is further configured to receive, through an HSS/HLR and an MME, the congestion reporting indication sent by the SM, or receive the congestion reporting indication directly from the SM; and the network device further includes an indication sending unit, configured to send the network switching indication information to the MME.

With reference to the ninth possible implementation manner of the sixth aspect, in a tenth possible implementation manner, the congestion state information indicates that the PGW or the SGW is congested.

With reference to any one of the sixth aspect to the fourth possible implementation manner of the sixth aspect, in an eleventh possible implementation manner, the network device is a mobility management entity MME.

With reference to the eleventh possible implementation manner of the sixth aspect, in a twelfth possible implementation manner, the network device further includes: a request receiving unit, configured to receive a first network connection request from the UE; and a rejection sending unit, configured to send a first network connection rejection message including the network switching indication information to the UE.

With reference to the twelfth possible implementation manner of the sixth aspect, in a thirteenth possible implementation manner, the first network connection request received by the request receiving unit is an attach request, and the first network connection rejection message sent by the rejection sending unit is an attach reject; or the first network connection request received by the request receiving unit is a PDN connectivity request, and the first network connection rejection message sent by the rejection sending unit is a PDN connectivity reject message.

With reference to any one of the eleventh possible implementation manner to the thirteenth possible implementation manner of the sixth aspect, in a fourteenth possible implementation manner, the indication receiving unit is further configured to receive, through an HSS/HLR, the congestion reporting indication sent by the SM; and the congestion state information sent by the information sending unit is sent to the SM through the HLR/HSS.

With reference to any one of the eleventh possible implementation manner to the thirteenth possible implementation manner of the sixth aspect, in a fifteenth possible implementation manner, the congestion state information indicates that the MME is congested.

With reference to the thirteenth possible implementation manner of the sixth aspect, in a sixteenth possible implementation manner, the network device further includes a notification receiving unit, configured to receive a congestion notification from an SGW, and the congestion state information sent by the information sending unit indicates that the SGW or a PGW is congested.

With reference to any one of the sixth aspect to the sixteenth possible implementation manner of the sixth aspect, in a seventeenth possible implementation manner, the network switching indication information includes information of the second mobile network.

With reference to the seventeenth possible implementation manner of the sixth aspect, in an eighteenth possible implementation manner, the information of the second mobile network includes at least one of a mobile network type, a mobile network identifier, and a mobile network index, where the mobile network index is used for indicating the mobile network type and/or the mobile network identifier stored in the user equipment.

A technical effect of the congestion control method and apparatus provided by the present invention is as follows: a network device reports congestion state information to a subscription manager (SM) when a mobile network is congested, and the SM determines, according to the congestion state information, whether a switch needs to be performed. For example, when the SM determines, according to the congestion state information, that a preset service policy is met (that is, determines that normal execution of a current service needs to be ensured), the SM instructs, through the network device, the user equipment to perform mobile network switching. This method considers a service requirement of a user equipment, and therefore can ensure normal execution of a service on a user equipment with an eUICC in the case of network congestion.

DESCRIPTION OF EMBODIMENTS

Figure 1:
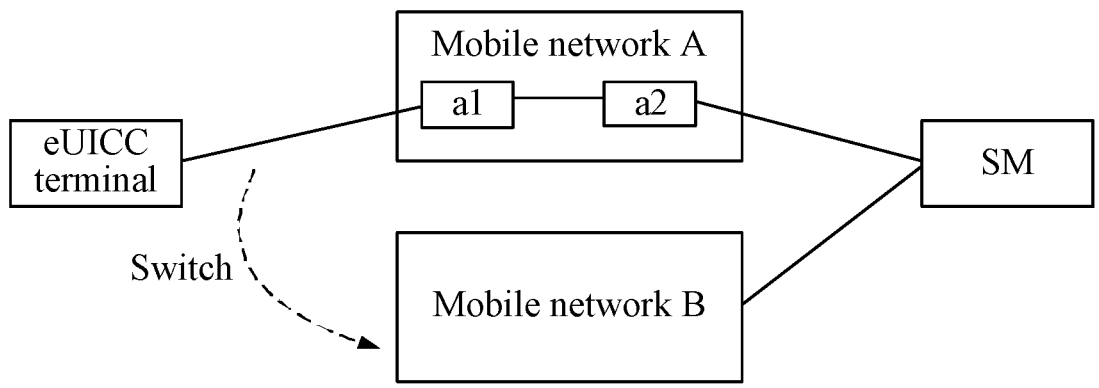
FIG. 1 is an architectural diagram of a system to which an embodiment of a congestion control method according to the present invention is applicable.

A congestion control method provided in embodiments of the present invention is targeted at a user equipment into which an eUICC is placed. A mobile network serving the eUICC user equipment can be changed without a need of removing the UICC card from the user equipment. FIG. 1 is an architectural diagram of a system to which an embodiment of a congestion control method according to the present invention is applicable. As shown in FIG. 1, an eUICC user equipment needs to access a mobile network and use a network service by using a network device in the mobile network, and an SM can communicate with multiple operators and multiple mobile networks. Specifically, the SM can communicate with a network device in the mobile network, or the SM may be co-located with a network device in the mobile network, for example, co-located with a home location register/home subscriber server (HLR/HSS), and can communicate with the eUICC user equipment by using the network device. For example, the eUICC user equipment accesses a mobile network A, and the SM can instruct, by using network devices a1 and a2 in the mobile network A, the eUICC user equipment to switch to a mobile network B (actually an eUICC in the eUICC user equipment is instructed to change operator information). The mobile network A and the mobile network B may be two mobile networks belonging to two different operators, and may also be two mobile networks belonging to one operator, for example, mobile networks using two different access technologies. For example, the mobile network A is a cellular network and the mobile network B is a wireless local area network.

The embodiments of the present invention mainly describe a method used by an SM to instruct an eUICC user equipment to switch to another mobile network when the eUICC user equipment requests access to a mobile network but the mobile network is congested, and network devices related to the switching method.

Embodiment 1

Figure 2:
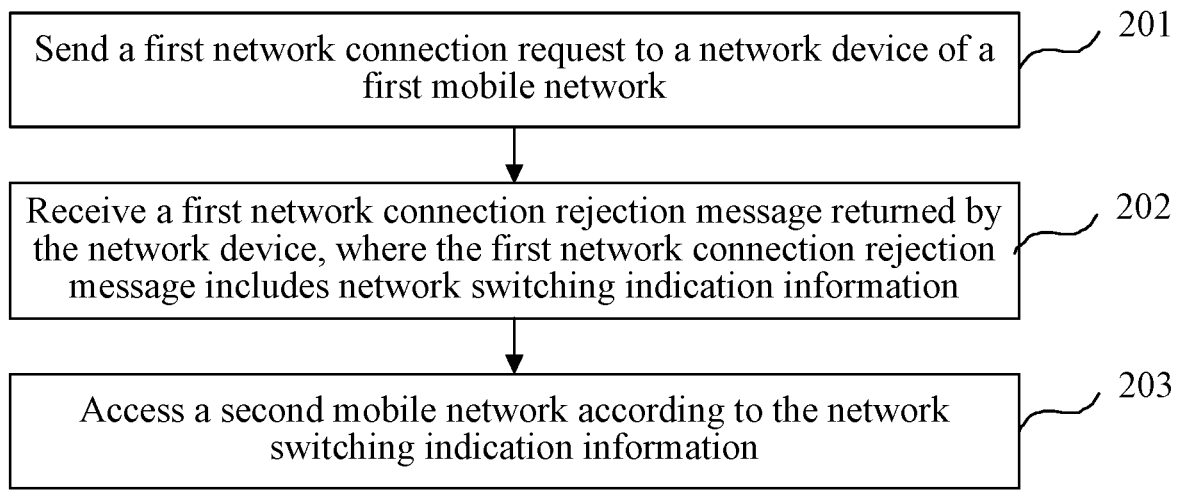
FIG. 2 is a schematic flowchart of an embodiment of the congestion control method according to the present invention.

FIG. 2 is a schematic flowchart of an embodiment of the congestion control method according to the present invention. This embodiment is a method executed by an eUICC user equipment, where the eUICC user equipment may be a mobile phone, a tablet computer, or a terminal device (such as a sensor or a machine communications gateway) in machine communications. As shown in FIG. 2, the method may include the following steps:

201: Send a first network connection request to a network device of a first mobile network.

A network type of the first mobile network in this embodiment may be a Long Term Evolution (LTE) network, a 2G/3G network, or the like. The network connection request sent to the network device may be, for example, an attach request or a PDN connectivity request sent to a mobility management entity (MME) in the LTE network, an activate PDP context request message sent by a user equipment (UE) to a serving GRPS support node (SGSN) in the 2G/3G access network, or the like.

In the embodiment of the present invention, both the MME and the SGSN are mobility management network elements.

202: Receive a first network connection rejection message returned by the network device, where the first network connection rejection message includes network switching indication information.

The first network connection rejection message is, for example, an attach reject message or a PDN connectivity reject message sent by the MME in the LTE network, an activate PDP context reject message returned by the SGSN to the UE in the 2G/3G access network, or the like.

The network switching indication information is used for instructing the user equipment to switch to a second mobile network, and the network switching indication information may be sent after the SM receives congestion state information from the first mobile network and determines that the UE needs to perform network switching.

For example, the congestion state information may include information indicating that the first mobile network is congested, and an identifier of the user equipment, or an APN used by the user equipment, or an identifier of a service requested by the user equipment.

In a specific implementation, the network switching indication information may be indicated by whether the network switching indication information is included, for example, if the network connection rejection includes the network switching indication information, it indicates that the user equipment needs to switch to the second mobile network; or the network switching indication information may be indicated by a value of the network switching indication, for example, if the value of the network switching indication is 1 or set to "switch", it indicates that the user equipment needs to switch to the second mobile network; and if the value of the network switching indication is 0 or set to "not switch", it indicates that the user equipment does not need to switch to the second mobile network.

The first network connection rejection message may further include second mobile network information corresponding to the second mobile network. The second mobile network information includes a mobile network type. For example, the mobile network type may be indicated as a cellular network, and an access technology for the cellular network such as 2G, 3G, or 4G may be further indicated; or the mobile network type may be indicated as a wireless local area network (WLAN), which may also be referred to as WiFi, and a wireless technology for the WLAN such as 802.11b and the 802.11n may be further indicated. The second mobile network information may also include a mobile network identifier. For example, the mobile network identifier may be a public land mobile network (PLMN) identifier of a cellular network, or may be a wireless local area network identifier such as an access point (AP) identifier or a service set identifier (SSID). The second mobile network information may also be a mobile network index. The mobile network index may be an index value used for identifying information such as the mobile network type and/or the mobile network identifier. For example, the UE may obtain, according to the index value, the information such as the mobile network type and/or the mobile network identifier of the second mobile network stored in the UE.

In this embodiment, when the UE sends the first network connection request to the network device of the first mobile network, the first mobile network may be congested, for example, the network device is congested due to overload, or a UE already occupies enough network resources so that congestion occurs due to limited resources. Therefore, the first mobile network reports congestion state information to the SM. The reporting may be performed by the network device which receives the first network connection request of the user equipment, or may be performed by another network device. The congestion state information may include, for example, one or more pieces of information of a congested device in the first mobile network and service-related information of a current network connection service. When the SM determines, according to the congestion state information, that a service corresponding to a network connection request message meets a preset service policy, the SM sends the network switching indication information, where the service policy is used for identifying a service of which normal execution needs to be ensured.

The determining process of the SM is described using an example: It is assumed that a UE is one of user equipments used by a service provider to implement a service Y of the service operator, where the UE has a built-in eUICC; and the service Y is a service for reporting patient condition in real time, which is very important and cannot be delayed. In order to prevent normal execution of the service Y from being delayed due to congestion when the UE accesses the first mobile network, the service provider may preset a service policy at an SM side by means of manual configuration. For example, the service policy is that "normal operation of devices providing the service Y must be ensured, and these devices may include the following device identifiers s1, s2, and s3", which indicates that if UEs corresponding to the three device identifiers access the first mobile network, normal execution of services running on the devices must be ensured when network congestion occurs. In order to ensure the normal running of the services, a manner used by the SM is that "if congestion occurs when any one of the three devices accesses the first mobile network, the SM instructs the device to switch to another mobile network", that is, the SM sends network switching indication information.

Correspondingly, the SM sends in advance the first mobile network a congestion reporting indication, which may indicate information on at least one of the following aspects: a first one is instructing the first mobile network to report, when the first mobile network is congested, congestion state information, and a second one may indicate what information the reported congestion state information specifically includes. For example, the SM may instruct the network device to include a device identifier of the UE sending the connection request in the reported congestion state information; after the SM receives the device identifier, for example, s3, the SM may determine that the UE corresponding to s3 is a device already set in the service policy, which indicates that the service corresponding to the network connection request message meets the preset service policy (because the UE initiates the network connection in order to implement, by using the network, a service, for example, the service Y, the service is referred to as a service corresponding to the network connection request message; and because the device s3 is set in the service policy in order to ensure normal running of the service on s3, it may be regarded that the service meets the service policy, that is, the service is a service of which normal running needs to be ensured). Therefore, when the first mobile network is congested, the SM instructs the UE to switch to the second mobile network.

The SM may also include a congestion reporting condition in the congestion reporting indication sent to the first mobile network, where the congestion reporting condition may include at least one of a list of user equipment identifiers which needs to be reported when congestion occurs, a list of APNs used by user equipments which needs to be reported when congestion occurs, and a list of identifiers of services requested by user equipments which needs to be reported when congestion occurs. In this case, when the first mobile network is congested, the network device of the first mobile network checks whether the identifier of the UE or the access point name (APN) used by the UE or the identifier of the service requested by the UE meets the congestion reporting condition; and if the identifier of the UE or the APN used by the UE or the identifier of the service requested by the UE is included in at least one of the lists, the network device of the first mobile network reports the congestion state information to the SM.

203: Access the second mobile network according to the network switching indication information.

Optionally, the first network connection rejection message further includes second mobile network information corresponding to the second mobile network, and the UE accesses the second mobile network according to the second mobile network information; or if the UE already stores the second mobile network information, the SM may not include the second mobile network information in the first network connection rejection message.

In the congestion control method in this embodiment, when failing to access a first mobile network, a user equipment may switch to a second mobile network according to network switching indication information returned by the first mobile network; therefore, normal running of a service of the user equipment can be ensured when the first mobile network is congested.

Embodiment 2

Figure 3:
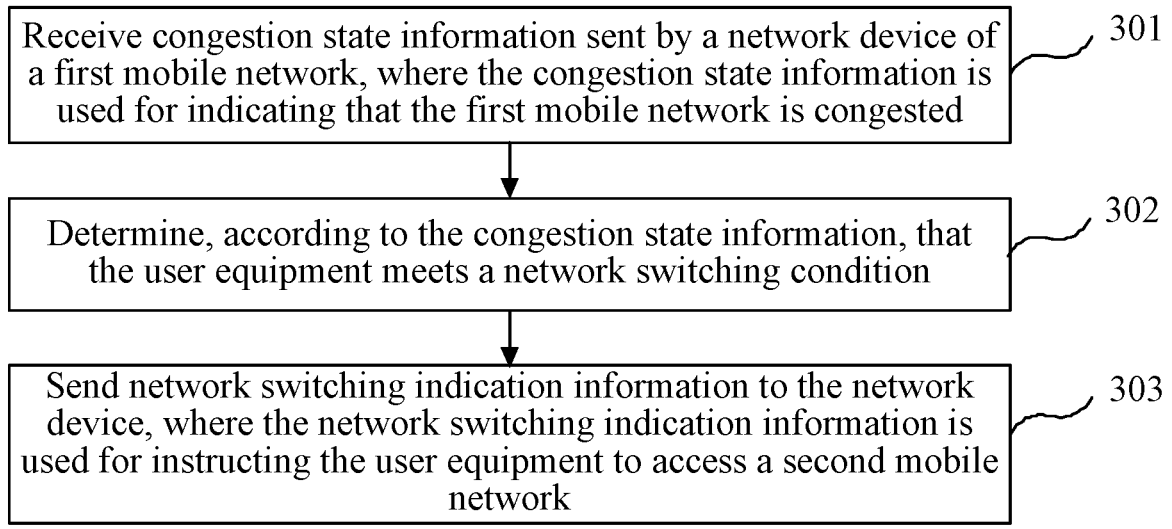
FIG. 3 is a schematic flowchart of another embodiment of the congestion control method according to the present invention.

FIG. 3 is a schematic flowchart of another embodiment of the congestion control method according to the present invention. This embodiment is a method executed by an SM. As shown in FIG. 3, the method may include the following steps:

301: Receive congestion state information sent by a network device of a first mobile network, where the congestion state information is used for indicating that the first mobile network is congested.

Optionally, the SM may also send a congestion reporting indication to the network device, where the congestion reporting indication is used for instructing the first mobile network to send, when the first mobile network is congested, the congestion state information. Congestion of the first mobile network actually refers to that congestions occurs on a network device in the first mobile network, for example, an MME is congested, or a serving gateway (SGW), or a packet data network gateway (PGW).

In addition, the network device which notifies, by a report, the SM of congestion in the first mobile network may be a congested network device or another network device. An example is as follows: It is assumed that an MME in the first mobile network is congested, the MME may report congestion state information to the SM according to the congestion reporting indication of the SM; or the MME may notify an HLR/HSS of a congestion state of the MME, and the HLR/HSS reports the congestion state information of the MME to the SM according to the congestion reporting indication of the SM.

The congestion reporting indication in this embodiment may also be used for notifying the network device of the first mobile network of what specific information is to be reported. For example, as described in Embodiment 1, the SM may instruct the network device to report a device identifier of a UE corresponding to a network connection request received by the congested device, so that the SM compares the device identifier with a stored service policy, thereby determining whether mobile network switching needs to be performed.

For example, if the SM sends the congestion reporting indication to the HLR/HSS in the first mobile network, when receiving a congestion notification sent by the MME (the notification may be sent when the MME receives the network connection request of the UE and is congested) the HLR/HSS reports congestion state information to the SM, where the congestion state information may include information of the user equipment. The information of the user equipment may include, for example, at least one of an identifier of the user equipment, an APN used by the user equipment, and an identifier of a service requested by the user equipment. The identifier of the user equipment may be an MME identifier (to indicate that the MME is congested) and a UE identifier s1, where the UE identifier s1 may be any one of an international mobile subscriber identity (IMSI), a mobile station international ISDN number (MSISDN), and an identifier (for example, a character string formed by a number, a letter, and the like) assigned by the SM to the UE, and the like.

302: Determine, according to the congestion state information, that the user equipment meets a network switching condition.

After receiving the congestion state information, the SM determines, according to information included in the congestion state information, whether the user equipment meets a network switching condition. For example, the network switching condition may include at least one of a list of identifiers of user equipments which need to perform network switching, a list of APNs used by user equipments which need to perform network switching, and a list of identifiers of services requested by user equipments which need to perform network switching.

Specifically, if the SM determines, according to the congestion state information, that the user equipment meets the network switching condition, the case may be that the identifier of the user equipment is in the user equipment identifier list which is included in the congestion reporting condition and needs to be reported, or the APN used by the user equipment is in the APN list which is included in the congestion reporting condition and needs to be reported, or the identifier of the service requested by the user equipment is in the service identifier list which is included in the congestion reporting condition and needs to be reported.

For example, it is assumed that the preset service policy stored in the SM includes the following user equipment identifiers s1, s2, and s3, which indicates that if congestion occurs when any one of the three user equipments accesses a network, normal execution of a service on the device needs to be ensured; therefore, the SM compares the device identifier s1 received in step 302 with the three device identifiers, and determines that a service on the UE corresponding to s1 meets the preset service policy, that is, the service belongs to the services of which normal execution needs to be ensured, and the SM returns network switching indication information to the network device of the first mobile network. Otherwise, it is assumed that the identifier of the UE in the message received by the SM is s4, which indicates that the service policy is not met, and a service on the UE corresponding to s4 may possibly be of low importance and have a low requirement on time; in this case, the network switching indication information does not need to be delivered, the UE does not need to be instructed to perform mobile network switching, but the UE may be instructed, as in an existing process, not to request a connection again within a time period, so that the UE waits for a time before attempting to access the network again.

303: Send network switching indication information to the network device, where the network switching indication information is used for instructing the user equipment to access a second mobile network.

When the SM sends the network switching indication information, for example, the SM may send the network switching indication information to the HLR/HSS, then the HLR/HSS sends the indication information to the MME, and finally the MME instructs, according to the network switching indication information, the UE to perform switching. Specifically, the MME may instruct the UE to switch to the second mobile network.

Optionally, as described in the foregoing in this embodiment, according to the network switching condition, the SM may include a congestion reporting condition in the congestion reporting indication sent to the network device. For example, the congestion reporting condition includes at least one of a list of user equipment identifiers which needs to be reported when congestion occurs, a list of APNs used by user equipments which needs to be reported when congestion occurs, and a list of identifiers of services requested by user equipments which needs to be reported when congestion occurs. An example is used for description: For example, if the service policy stored on an SM side includes that identifiers of user equipments of which normal service running needs to be ensured are s1, s2, and s3, the SM may include the user equipment identifiers s1, s2, and s3 in the congestion reporting indication and send the congestion reporting indication to the HLR/HSS; therefore, the user equipment identifiers s1, s2, and s3 may be referred to as the congestion reporting condition, and the SM instructs the HLR/HSS that the HLR/HSS does not need to report congestion state information in all congestion states but reports network congestion state information to the SM only when the mobile network is congested and a connection request sent by a UE corresponding to one of the user equipment identifiers is received. In addition, the SM may also include information such as an APN and a service identifier in the congestion reporting condition.

For example, if the HLR/HSS learns that a current network connection is initiated by a UE of which a user equipment identifier is s1, the congestion reporting condition is met, and the HLR/HSS reports congestion state information to the SM, where the congestion state information in this case may carry the identifier s1 of the UE or may not carry the identifier s1 (because in this case the SM may regard by default, that as long as the congestion state information is reported, the service policy is already met); otherwise, if the HLR/HSS learns that the current network connection is initiated by a UE of which a user equipment identifier is s4, the congestion reporting condition is not met, and the HLR/HSS does not report congestion state information to the SM. That is, the first mobile network reports the congestion state information to the SM only when the first mobile network is congested and the congestion reporting condition is met.

Optionally, the HLR/HSS may not need to distinguish a UE identifier, but reports the congestion state information to the SM as long as congestion occurs. In this case, the congestion state information together with a UE identifier, however, may be sent to the SM, so that the SM determines, according to the UE identifier and the service policy, whether to send the network switching indication information.

Optionally, the congestion reporting condition of the congestion state information may include, for example, at least one of a user equipment identifier, an access point identifier APN, a service identifier, and other information which may be used for identifying a service.

In addition, the network switching indication information may further include information of the second mobile network. The information of the second mobile network includes at least one of a mobile network type, a mobile network identifier, and a mobile network index, where the mobile network index is used for indicating the mobile network type and/or the mobile network identifier stored in the user equipment.

In the congestion control method in this embodiment, an SM sends a congestion reporting indication to a network device of a first mobile network, so that the network device can report a congestion state to the SM according to the indication when the first mobile network is congested, and the SM can determine whether a UE needs to be instructed to perform mobile network switching during current congestion, so as to instruct, in a timely manner, the UE to perform mobile network switching when the UE needs to perform switching and ensure normal running of a service of the UE.

Embodiment 3

Figure 4:
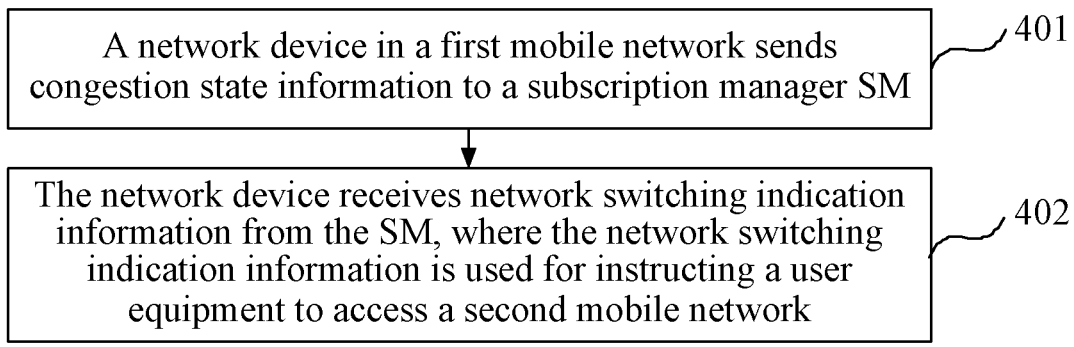
FIG. 4 is a schematic flowchart of still another embodiment of the congestion control method according to the present invention.

FIG. 4 is a schematic flowchart of still another embodiment of the congestion control method according to the present invention. This embodiment is executed by a network device in a first mobile network. As shown in FIG. 4, the method may include the following steps:

401: A network device in a first mobile network sends congestion state information to a subscription manager SM.

The congestion state information is used for indicating that the first mobile network is congested, and the congestion state information includes information of a user equipment UE.

For example, the information of the UE may include at least one of an identifier of the UE, an APN used by the UE, and an identifier of a service requested by the UE.

Optionally, the congestion state information may be sent after the network device receives a congestion reporting indication from the SM, where the congestion reporting indication is used for instructing the first mobile network to send, when the first mobile network is congested, the congestion state information. For example, the congestion reporting indication may include a congestion reporting condition, and the user equipment meets the congestion reporting condition.

For example, that the user equipment meets the congestion reporting condition includes that the identifier of the user equipment is in a user equipment identifier list which is included in the congestion reporting condition and needs to be reported; or the APN used by the user equipment is in an APN list which is included in the congestion reporting condition and needs to be reported; or the identifier of the service requested by the user equipment is in a service identifier list which is included in the congestion reporting condition and needs to be reported.

402: The network device receives network switching indication information from the SM, where the network switching indication information is used for instructing the user equipment to access a second mobile network.

For example, the network switching indication information may include information of the second mobile network. The information of the second mobile network includes at least one of a mobile network type, a mobile network identifier, and a mobile network index, where the mobile network index is used for indicating the mobile network type and/or the mobile network identifier stored in the user equipment.

The following Embodiment 4 to Embodiment 6 are methods executed by network devices in a mobile network, and differences between the network devices in the three embodiments lie in that the network devices play different roles in the mobile network in a switching procedure and have different relationships with an SM.

Embodiment 4

Figure 5:
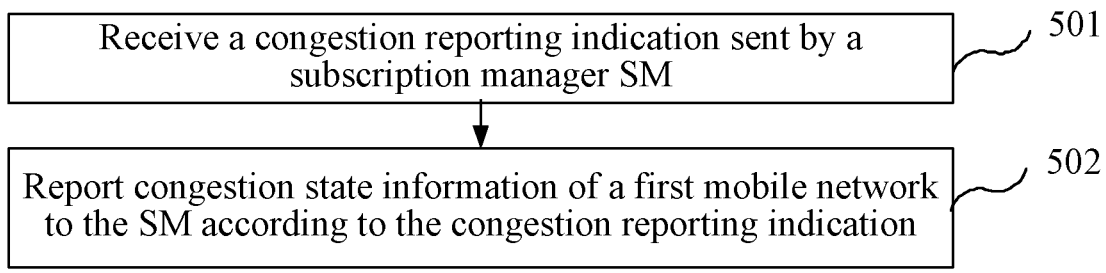
FIG. 5 is a schematic flowchart of still another embodiment of the congestion control method according to the present invention.

FIG. 5 is a schematic flowchart of still another embodiment of the congestion control method according to the present invention. As described in the foregoing embodiment, an SM sends a congestion reporting indication to a network device in a mobile network. The network device in this embodiment is a device which directly receives the congestion reporting indication sent by the SM, that is, the SM directly communicates with the network device in this embodiment. The SM directly instructs the network device to perform congestion control, that is, instructs the network device to control the mobile network to report a congestion state.

As shown in FIG. 5, the method may include the following steps:

501: Receive a congestion reporting indication sent by a subscription manager SM.

For example, an HLR/HSS in a mobile network receives the congestion reporting indication sent by the SM; or a gateway device (SGW or PGW) in the mobile network receives the congestion reporting indication sent by the SM.

502: Report congestion state information of the first mobile network to the SM according to the congestion reporting indication.

There may be a plurality of control manners for reporting the congestion state information of the first mobile network to the SM.

An optional manner is that the network device which receives the congestion reporting indication sent by the SM reports a congestion state of the network device.

Specifically, when the network device which directly receives the congestion reporting indication is congested, the network device may report, to the SM, congestion state information used for notifying that the network device is congested. For example, a PGW in the mobile network may receive the congestion reporting indication directly sent by the SM and report congestion state information to the SM when the PGW is congested, where the congestion state information may include a device identifier of the PGW.

In addition, the PGW may send the congestion state information when receiving a connection establishment request of an MME, where the connection establishment request of the MME is sent when the MME receives a network connection request message of a UE, and the network connection request message of the UE is used by the UE to access a network to implement a service. Therefore, when reporting the congestion state information, the PGW may also report an identifier of the UE to the SM, and the SM can learn, according to the identifier of the UE, which UE is accessing the network when congestion occurs and which service the UE is configured to implement. Therefore, the identifier of the UE may be referred to as a determination reference identifier and is a determination reference identifier of a service corresponding to the network connection request message.

In this manner, the network device may also receive a network switching indication returned by the SM, where the network switching indication is sent when the SM determines, according to the determination reference identifier, that the service meets a preset service policy. According to the network switching indication, the user equipment is instructed to switch to a second mobile network. For example, the PGW may send the network switching indication to the MME, and the MME instructs the user equipment to perform switching.

Another optional manner is that the network device which receives the congestion reporting indication of the SM reports a congestion state of another network device in the same mobile network. The network device which receives the congestion reporting indication of the SM can communicate with the another network device, and therefore can learn that the another network device is congested.

Specifically, the network device which directly receives the congestion reporting indication may receive a congestion notification sent by a network device in the first mobile network, where the congestion notification is sent when the network device receives a network connection request message sent by a user equipment and is congested. At this time, the network device which directly receives the congestion reporting indication may report the congestion state information to the SM.

An example is as follows: The network device which directly receives the congestion reporting indication of the SM may be an HLR/HSS in the mobile network, where the HLR/HSS can receive a congestion notification sent by an MME; for example, when the MME receives a network connection request message sent by a UE, and if the MME is congested, the MME may send a congestion notification to the HLR/HSS, so as to notify the HLR/HSS that the MME is congested and cannot process the connection request of the UE. At this time, the HLR/HSS reports to the SM the congestion state information carrying a device identifier of the MME and a determination reference identifier of a service corresponding to the network connection request message. For example, the determination reference identifier is a device identifier of the UE. The determination reference identifier is used by the SM to determine, according to the determination reference identifier, whether to instruct the UE to perform mobile network switching.

In this manner, the network device, namely the HLR/HSS, may also receive a network switching indication returned by the SM, where the network switching indication is sent when the SM determines, according to the determination reference identifier, that the service meets a preset service policy. And the SM forwards the network switching indication to the MME, and the MME instructs, according to the network switching indication, the user equipment to switch to a second mobile network.

Still another optional manner is that the network device which receives the congestion reporting indication of the SM sends the congestion reporting indication and address information of the SM to another network device in the same mobile network, and the another network device continues with congestion reporting control.

For example, still using that the HLR/HSS in the mobile network is the network device which directly receives the congestion reporting indication of the SM as an example, the HLR/HSS may send the received congestion reporting indication and the address information of the SM to the MME. At this time, the MME may have two options: one is that the MME reports congestion state information to the SM according to the foregoing information (the congestion state information may be that the MME is congested, or may be that another device, for example, a gateway device, is congested); and the other is that the MME continues to forward the congestion reporting indication and the address information of the SM to another network device, for example, a gateway device, and the gateway device reports congestion state information.

As can be seen from the foregoing example, in this manner, the network device, for example, the HLR/HSS, which directly receives the congestion reporting indication sent by the SM does not take part in a subsequent process related to congestion state reporting. The HLR/HSS only receives the congestion reporting indication from the SM and forwards the congestion reporting indication to another device, and the another device reports the congestion state information to the SM. Although the HLR/HSS does not take part in the subsequent process, the HLR/HSS is still equivalent to a congestion control device because the HLR/HSS triggers the congestion state reporting of the another device. In addition, in this manner, the HLR/HSS does not receive a network switching indication delivered by the SM either, and the SM may directly deliver the network switching indication to the device which directly reports the congestion state information.

Optionally, in the congestion control method in this embodiment, the congestion reporting indication may also include the congestion reporting condition; and when the first mobile network is congested and the congestion reporting condition is met, the first mobile network reports the congestion state information to the SM.

Embodiment 5

Figure 6:
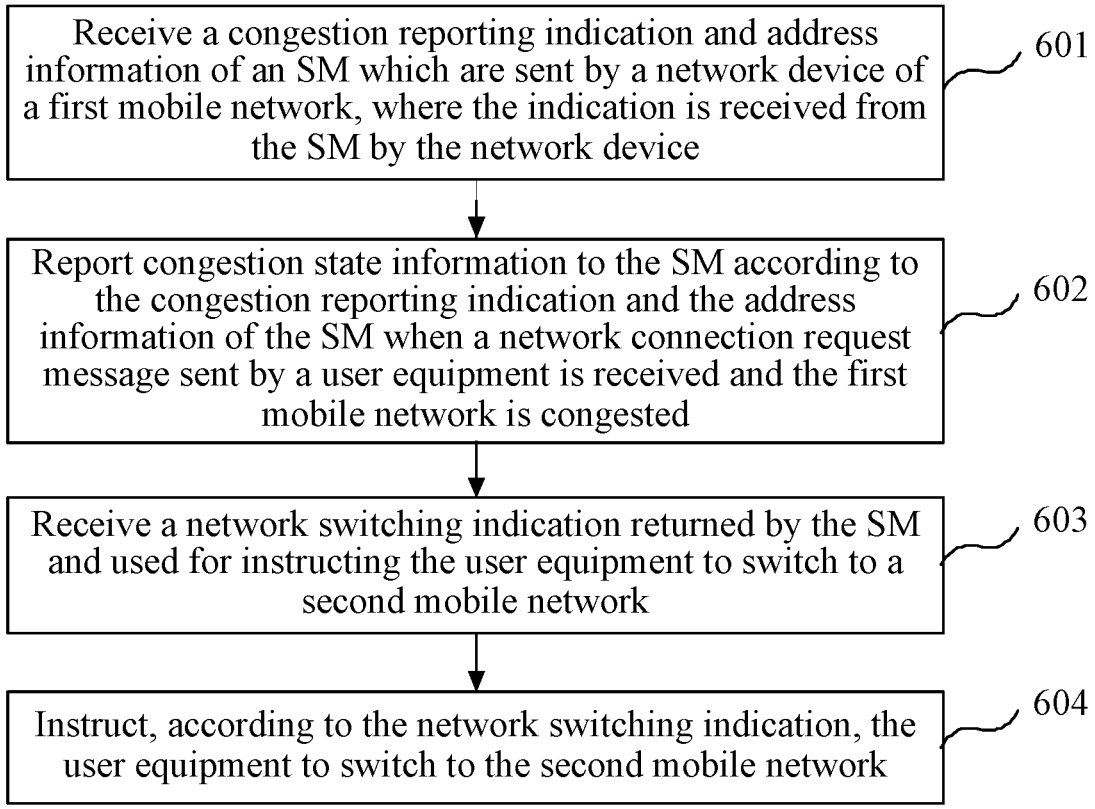
FIG. 6 is a schematic flowchart of still another embodiment of the congestion control method according to the present invention.

FIG. 6 is a schematic flowchart of still another embodiment of the congestion control method according to the present invention. A network device in this embodiment is a device which does not directly receive a congestion reporting indication sent by an SM, that is, the SM does not directly communicate with the network device in this embodiment. However, the network device in this embodiment still receives the congestion reporting indication and controls reporting of congestion state information of a first mobile network, but the congestion reporting indication received by the network device is received from another device in the same network rather than received directly from the SM.

As shown in FIG. 6, the method may include the following steps:

601: Receive a congestion reporting indication and address information of a subscription manager SM which are sent by a network device of a first mobile network, where the congestion reporting indication is received from the SM by the network device.

For example, an MME in a mobile network receives a congestion reporting indication and address information of an SM which are sent by an HLR/HSS, where the congestion reporting indication is received from the SM by the HLR/HSS.

602: Report congestion state information to the SM according to the congestion reporting indication and the address information of the SM when a network connection request message sent by a user equipment is received and the first mobile network is congested.

There may be a plurality of control manners for reporting the congestion state information to the SM.

One optional manner is that the network device in this embodiment reports a congestion state of the network device.

For example, when the MME receives a network connection request message sent by a UE, if the MME is congested, the MME may send congestion state information to the SM, where the congestion state information may include a device identifier of the MME and a determination reference identifier of a service corresponding to the network connection request message. For example, the determination reference identifier is a device identifier of the UE.

Another optional manner is that the network device in this embodiment reports a congestion state of another network device in the same network. The network device and the another network device can communicate with each other; therefore, the network device can learn that the another network device is congested.

For example, after receiving a network connection request message sent by a UE, the MME sends a connection establishment request to a gateway device (for example, a PGW); and if the gateway device is congested, the gateway device sends a congestion notification to the MME. It should be noted that although the gateway device does not directly receive the network connection request message of the UE, the connection establishment request sent by the MME and received by the gateway device is caused by the network connection request message of the UE; therefore, it may also be described in this embodiment that the gateway device sends the congestion notification when the gateway device receives the network connection request message of the user equipment and is congested. A similar case related to embodiments of the present invention is not described repeatedly.

After receiving the congestion notification, the MME reports congestion state information to the SM, where the congestion state information includes a device identifier of the gateway device and a determination reference identifier of a service corresponding to the network connection request message, for example, a UE identifier.

Still another optional manner is that the network device in this embodiment may also send the congestion reporting indication and the address information of the SM to another network device in the same mobile network, and the another network device continues with congestion reporting control.

For example, after receiving the congestion reporting indication and the address information of the SM which are sent by the HLR/HSS, the MME may send the foregoing information to a gateway device, and the gateway device may report congestion state information to the SM according to the information when the gateway device is congested.

603: Receive a network switching indication returned by the SM and used for instructing the user equipment to switch to a second mobile network.

The network switching indication is sent when the SM determines, according to the congestion state information, that the service corresponding to the network connection request message meets a preset service policy.

It should be noted that in this step, the network switching indication returned by the SM may be received directly or indirectly. For example, after the MME reports the congestion state information to the SM, the MME may receive the network switching indication returned by the SM; or after the MME sends the congestion reporting indication and the address information of the SM to the gateway device, the gateway device reports the congestion state information to the SM, and in this case, the gateway device receives the network switching indication returned by the SM, and the gateway device forwards the network switching indication to the MME.

604: Instruct, according to the network switching indication, the user equipment to switch to the second mobile network.

For example, the MME sends the network switching indication to the UE, and the UE switches to the second mobile network according to the indication.

Embodiment 6

Figure 7:
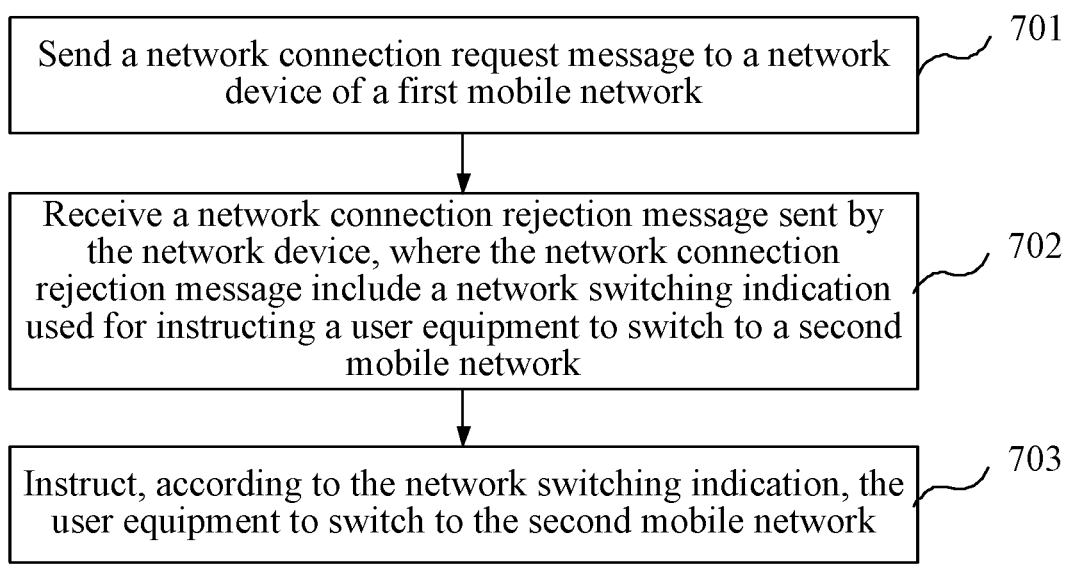
FIG. 7 is a schematic flowchart of still another embodiment of the congestion control method according to the present invention.

FIG. 7 is a schematic flowchart of still another embodiment of the congestion control method according to the present invention. A network device in this embodiment neither receives a congestion reporting indication sent by an SM nor reports a congestion state to the SM. However, the network device reports a congestion state of the network device to another device, so that the another device reports congestion information of the network device to the SM, and is responsible for sending a UE a network switching indication returned by the another device.

As shown in FIG. 7, the method may include the following steps:

701: Send a network connection request message to a network device of a first mobile network.

For example, after receiving a network connection request message sent by a UE, an MME sends a connection establishment request to a gateway device.

702: Receive a network connection rejection message sent by the network device, where the network connection rejection message includes a network switching indication used for instructing a user equipment to switch to a second mobile network.

For example, the MME receives a connection establishment rejection returned by the gateway device, where the connection establishment rejection further includes a network switching indication used for instructing the user equipment to switch to a second mobile network.

The network switching indication is received by the gateway device from an SM, and is sent when the SM determines, according to congestion state information reported by the gateway device when congested, that a service corresponding to the network connection request message meets a preset service policy.

703: Instruct, according to the network switching indication, the user equipment to switch to the second mobile network.

For example, the MME instructs the UE to switch to the second mobile network.

Optionally, after the MME receives the network connection request message sent by the UE, if the MME is congested, the MME may include a congestion notification in the connection establishment request sent to the gateway device in step 601, so as to inform the gateway device that the MME is congested; therefore, the gateway device reports to the SM that the MME is congested, and after receiving a network switching indication returned by the SM, the gateway device sends the switching indication to the MME, and the MME instructs, according to the indication, the UE to perform mobile network switching.

The following uses five embodiments (Embodiment 7 to Embodiment 11) to describe how a UE, under the control of an SM, switches to another mobile network when a mobile network is congested, so as to ensure normal running of a service on the UE. It should be noted that the five embodiments all use an LTE network and a network device in the LTE network as an example to describe the congestion control method according to the embodiments of the present invention. However, in a specific implementation, the present invention is not limited to the LTE network and the network device in the LTE network, and is also applicable to other networks.

Embodiment 7

Figure 8:
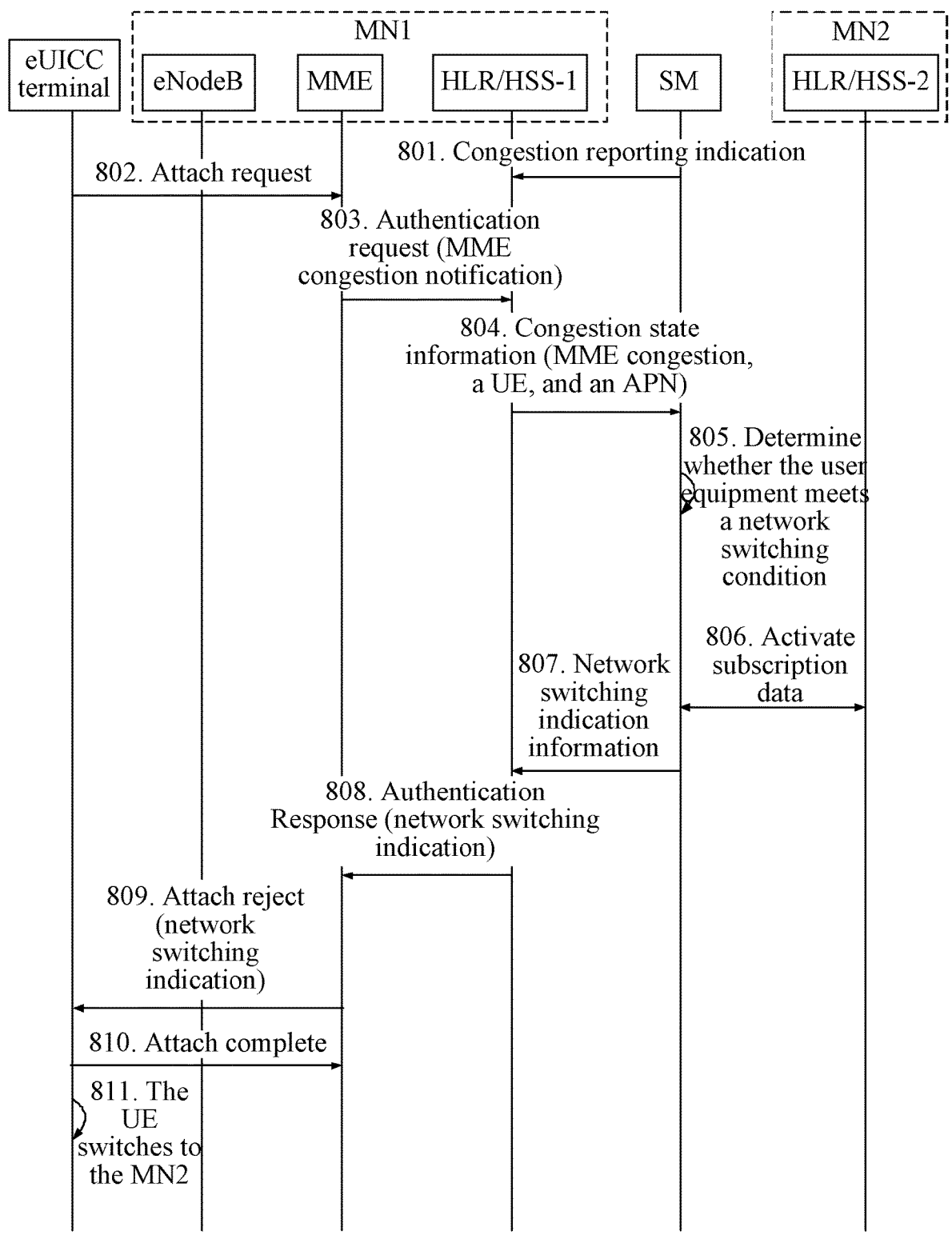
FIG. 8 is a schematic signaling diagram of still another embodiment of the congestion control method according to the present invention.

FIG. 8 is a schematic signaling diagram of still another embodiment of the congestion control method according to the present invention. As shown in FIG. 8, an eUICC user equipment in this embodiment is a device arranged by a service provider to implement a service, and a service contract is signed between a server for the service and a first mobile network operator (MNO), so that a mobile network MN1 of the first mobile operator provides a network service for the server to implement the service. Therefore, the eUICC user equipment needs to access the service of the service provider through the MN1. An SM can communicate with the first mobile network MN1 and a second mobile network MN2, and can control switching of the eUICC user equipment through the network.

In this embodiment, it is assumed that an MME in the MN1 is congested; and for ease of description, an eUICC user equipment is briefly referred to as a UE in the following. As shown in FIG. 8, the congestion control method in this embodiment includes the following steps:

801: An SM sends subscription data including a congestion reporting indication (Congestion Action) to a first home location register/home subscriber server HLR/HSS-1 of an MN1.

The congestion reporting indication is used for indicating that congestion state information needs to be reported to the SM when the network MN1 is congested.

Optionally, the sent congestion reporting indication may include a congestion reporting condition, where the congestion reporting condition is used for indicating a condition in which the congestion state information is reported to the SM, and the first mobile network needs to report the congestion state information to the SM when the first mobile network is congested and the congestion reporting condition is met.

For example, the congestion reporting condition may include at least one of a user equipment identifier (UE identifier), an access point name (APN) identifier, a service identifier, and the like. Specifically, for example, the SM requires a congestion state to be reported only for a UE running a high-priority service or an important service; therefore, the SM may indicate an identifier of the UE of this type, and the MN1 notifies the SM only if congestion occurs when the UE of this type accesses the network. This manner may be referred to as congestion reporting of UE granularity. For another example, congestion reporting of service granularity may be also set. The service granularity may be distinguished according to an APN, for example, if the SM delivers an APN identifier to the MN1, the MN1 notifies the SM only when the UE requests establishment of a bearer or a PDP related to the APN and the network is congested. For still another example, setting may also be performed for a specific service or application identifier (Service id or Application/App id). In this case, if the SM sends the service or application identifier to the MN1, the MN1 notifies the SM only when the UE requests establishment of a bearer or a PDP related to the service or application identifier and the network is congested.

802: A device with an eUICC installed therein (that is, an eUICC user equipment, which is briefly referred to as an UE in the description of this embodiment) sends an attach request message (Attach Request) to an MME, where the attach request is a network connection request message sent to the MN1.

The MME may be a device in the original subscription mobile network MN1 of the UE; and in the case of roaming, the MME may also be a device in a visited network having a roaming agreement with the MN1.

803: The MME sends an authentication request message (Authentication Request) to the first home location register/home subscriber server HLR/HSS-1.

When the MME is congested, or resources for a service belonging to the UE are limited, the authentication request message may include congestion indication information, for example, an "MME congestion indication (MME Congestion Indication)".

It should be noted that the authentication request message may also be referred to as a network connection request (in this embodiment, a message for communication between two devices is referred to as a connection request), and the congestion indication sent by the MME to the HLR/HSS-1 may be referred to as a "congestion notification". That is, this step is that the MME sends a congestion notification indicating that the MME is congested to the HLR/HSS-1, where the congestion notification is sent when the MME receives the network connection request message (Attach Request) sent by the UE and the MME is congested.

Optionally, the congestion notification may also be sent by the MME to the HLR/HSS-1 in a location update procedure following completion of an authentication procedure. That is, the MME sends an update location request message to the HLR/HSS-1, where the message includes a congestion indication, for example, an "MME congestion indication".

804: The HLR/HSS-1 reports congestion state information to the SM according to the congestion reporting indication received in step 801.

For example, the HLR/HSS-1 sends a Notification Request message to the SM, where the message carries congestion state information. For example, the congestion state information may include information indicating that the first mobile network is congested, and an identifier of the user equipment, or an APN used by the user equipment, or an identifier of a service requested by the user equipment.

In this embodiment, when the MME is congested, the MME sends a congestion report to the HLR/HSS-1. For example, the congestion state information sent by the HLR/HSS-1 to the SM may include an MME identifier (or an indication for identifying MME congestion) and a UE identifier.

805: The SM determines, according to the congestion state information, whether the user equipment meets a network switching condition.

A specific determining method is already described in the foregoing embodiments, and is not described in detail herein again. If a determination result of the SM is that a new mobile network needs to be selected for the UE, for example, it is determined according to the UE identifier that the identifier is in a list of identifiers of UEs which need to perform network switching, proceed with step 806; or if a determination result is that no new mobile network needs to be selected for the UE, the SM instructs the HLR/HSS-1 to perform a process according to the prior art.

806: The SM activates subscription data, in an MN2, of the UE.

The SM may send an activate profile request message to a second home location register/home subscriber server HLR/HSS-2 of the new mobile network MN2 selected for the UE, where the message may include a UE identifier, for example, an IMSI of the UE, an identifier assigned by the SM to the UE, or the like. The HLR/HSS-2 sends an activate profile response message (Activate Profile Response) message to the SM, thereby completing activation of the subscription data, in the MN2, of the UE.

Optionally, if the subscription data of the UE is already activated in the MN2, this step does not need to be performed.

807: The SM returns network switching indication information to the HLR/HSS-1.

For example, the SM sends a Notification Response message to the HLR/HSS-1. When the determination result of the SM in 805 is that a new mobile network needs to be selected, in this step, the SM further includes mobile network information Subscription profile, in the MN2, of the UE in the Notification Response message; if the SM determines that the mobile network information in the MN2 is already preconfigured in the UE, the mobile network information in the MN2 does not need to be included, and it is only required to inform the UE that the UE needs to perform switching or needs to switch to the MN2, so as to instruct the UE to activate the mobile network information in the MN2 and switch to the mobile network MN2.

In addition, an objective of the SM sending the network switching indication information is to instruct the UE to perform mobile network switching, and there is a plurality of manners for setting the network switching indication information. For example, when switching needs to be performed, "MN Switch" may be sent; and when switching does not need to be performed, "NOT Switch" may be sent. Alternatively, when switching needs to be performed, "MN Switch" is sent; and when switching does not need to be performed, the "MN Switch" is not included.

808: The HLR/HSS-1 returns an authentication response carrying the network switching indication information to the MME.

Optionally, the network switching indication information may also be sent to the MME by being included in an update location acknowledgement (Update Location Ack) message returned by the HLR/HSS-1 to the MME.

809: The MME sends an attach reject message (Attach Reject), which carries the network switching indication information used for indicating switching to the MN2, to the UE.

For example, the Attach Reject message received by the UE carries the mobile network information Subscription profile, in the MN2, of the UE and an MN Switch indication.

810: The UE sends an attach complete message (Attach Complete) to the MME.

811: The UE completes switching to the MN2 according to received related information of the MN2.

For example, the UE detaches from the MN1, activates the mobile network information of the MN2, and attaches to the MN2; when the UE is in a roaming state, the UE selects a visited network (VPLMN) having a roaming agreement with the MN2 in a roaming area and completes an attach.

Optionally, the MME in this embodiment is a mobility management entity device in an LTE network, but this embodiment is also applicable to other mobile networks, including an SGSN and an MSC/VLR in a 2G/3G network; correspondingly, an eNodeB in the flowchart may be a BSC or an RNC.

In this embodiment, the MME is congested, the MME reports to the HLR/HSS, and the HLR/HSS reports the congestion state information to the SM; and the SM directly delivers the congestion reporting indication to the HLR/HSS.

Embodiment 8

Figure 9:
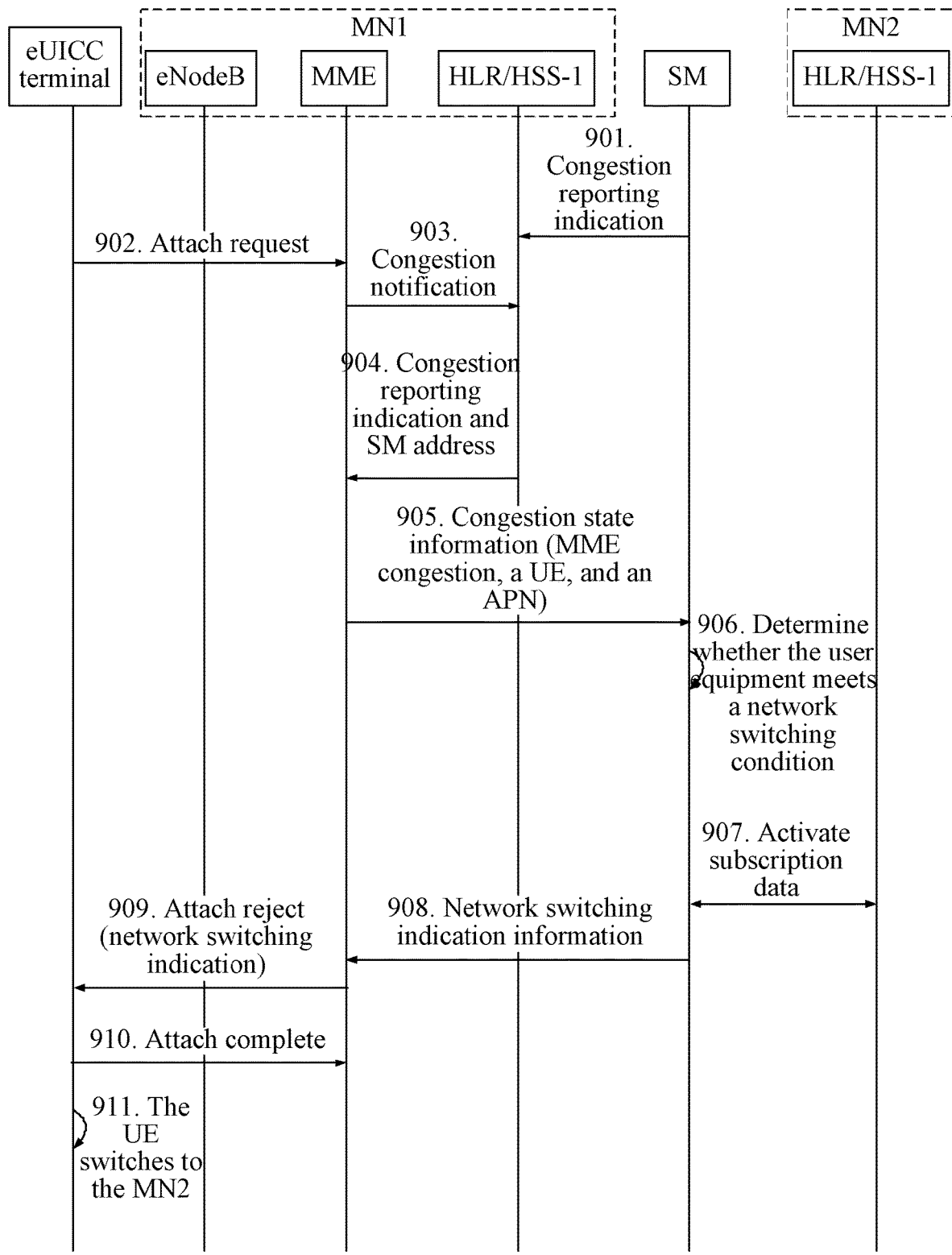
FIG. 9 is a schematic signaling diagram of still another embodiment of the congestion control method according to the present invention.

FIG. 9 is a schematic signaling diagram of still another embodiment of the congestion control method according to the present invention. This embodiment still uses that an MME in an MN1 is congested as an example, but a difference between this embodiment and the foregoing embodiment lies in that an HLR/HSS sends an address of an SM to the MME, and the MME reports congestion state information.

As shown in FIG. 9, the congestion control method in this embodiment includes:

901: An SM sends subscription data including a congestion reporting indication to an HLR/HSS-1 of an MN1.

902: A UE sends an attach request message to an MME.

903: The MME sends a congestion notification to the HLR/HSS-1.

For example, the MME sends an authentication request message Authentication Request to the HLR/HSS-1; and when the MME is congested or resources for a service belonging to the UE are limited, the authentication request message may include a congestion indication, for example, an "MME congestion indication", that is, the MME sends a congestion notification indicting that the MME is congested to the HLR/HSS-1.

Optionally, the congestion notification may also be sent by the MME to the HLR/HSS-1 in a location update procedure following completion of an authentication procedure. That is, the MME sends an update location request message to the HLR/HSS-1, where the message includes a congestion indication, for example, an "MME congestion indication".

904: The HLR/HSS-1 sends the congestion reporting indication and address information of the SM which are received from the SM to the MME.

For example, the HLR/HSS-1 sends an authentication response message Authentication Response to the MME, where the message includes the congestion reporting indication and address information of the SM.

Alternatively, the congestion reporting indication and the address information (SM Address) of the SM may also be sent to the MME by being included in an update location acknowledgement (Update Location Ack) message sent by the HLR/HSS-1 to the UE.

905: The MME reports congestion state information to the SM.

For example, when the MME is congested or resources for the UE requesting a connection are limited, the MME sends a Notification Request message to the SM according to the congestion reporting indication and the address information of the SM, where the message carries congestion state information. For example, the congestion state information may include a device identifier of a congested device and a determination reference identifier for a current network connection service.

In this embodiment, when the MME is congested, the congestion state information sent by the MME to the SM may include an MME identifier (or an indication for identifying MME congestion). The determination reference identifier may be an identifier of the current UE, for example, an IMSI, or an identifier of a service of the UE, and may also be an identifier of an APN subscribed to by the UE or the like.

906: The SM determines, according to the congestion state information, whether the user equipment meets a network switching condition.

For example, the network switching condition may include at least one of a list of identifiers of user equipments which need to perform network switching, a list of APNs used by user equipments which need to perform network switching, and a list of identifiers of services requested by user equipments which need to perform network switching. In this step, for example, the SM may determine, according to a UE identifier carried in the congestion state information, whether the UE identifier is in the user equipment identifier list; and if the UE identifier is in the user equipment identifier list, it indicates that the UE meets the network switching condition; otherwise, it indicates that the UE does not meet the network switching condition.

907: The SM activates subscription data, in an MN2, of the UE.

For a specific activation process, reference may be made to step 806, which is not described in detail in this embodiment again.

908: The SM returns a network switching indication, which is used for instructing the user equipment to switch to the MN2, to the MME.

For example, the SM sends a Notification Response message to the HLR/HSS-1. The Notification Response message includes mobile network information Subscription profile, in the MN2, of the UE and "MN Switch" used for indicating switching.

909 to 911 are identical with those in the foregoing embodiment, and are not described repeatedly.

The MME in this embodiment is a mobility management entity device in an LTE network, but this embodiment is also applicable to other mobile networks, including an SGSN and an MSC/VLR in a 2G/3G network; correspondingly, an eNodeB in the flowchart may be a BSC or an RNC.

Embodiment 9

Figure 10:
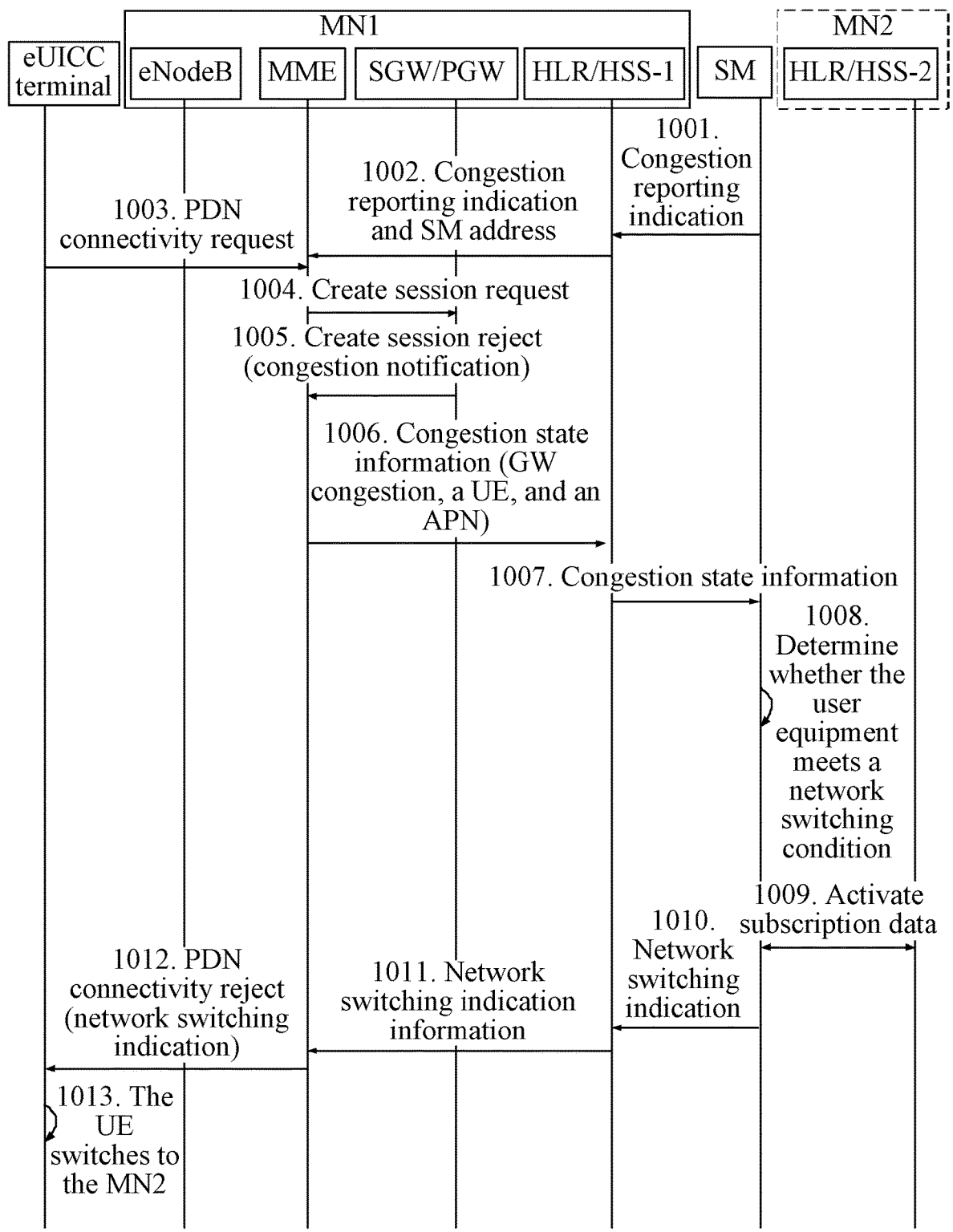
FIG. 10 is a schematic signaling diagram of still another embodiment of the congestion control method according to the present invention.

FIG. 10 is a schematic signaling diagram of still another embodiment of the congestion control method according to the present invention. This embodiment uses that an SGW or a PGW in an MN1 is congested as an example, which may specifically be that the SGW or PGW device is congested or resources for a service belonging to a UE are limited, for example, for "congestion control based on an APN", the number of bearers assigned to the APN on the SGW or the PGW reaches an upper limit.

As shown in FIG. 10, the congestion control method in this embodiment includes:

1001: An SM sends subscription data including a congestion reporting indication to an HLR/HSS-1 of an MN1.

1002: The HLR/HSS-1 sends the congestion reporting indication and address information of the SM to an MME.

For example, the HLR/HSS-1 may send the foregoing information to the MME by including the information in an authentication response message or an update location acknowledge (Update Locate Ack) message sent to the MME.

1003: An UE sends a PDN connectivity request message to the MME, where the PDN connectivity request message is a network connection request message sent to the MN1.

1004: The MME sends a create session request message to an SGW, and the SGW sends a create session request message to a PGW.

When the SGW is congested, the SGW sends a create session reject message to the MME. The reject message includes a congestion indication (Congestion Ind) and back-off time, indicating that the SGW is congested or resources for the UE are limited; and it may be described that the SGW sends a congestion notification to the MME. Perform step 1006.

1005: The PGW is congested, the PGW sends a create session reject message to the SGW, and the SGW sends a create session reject message to the MME, where the reject message includes a congestion indication (Congestion Ind) and back-off time, indicating that the PGW is congested or resources for the UE are limited; and it may be described that the PGW sends a congestion notification to the MME.

1006: The MME receives the create session reject message in step 1004 or step 1005, and sends an update location request or a notification request to the HLR/HSS-1 according to the congestion reporting indication received in 1002, which may be equivalent to reporting congestion state information or construed as a congestion notification, where the congestion state information or the congestion notification is that a gateway device is congested.

For example, the update location request or the notification request includes a UE identifier, for example, an IMSI; a GW congestion indication, for example, SGW congestion or PGW congestion; and/or APN information, and so on.

1007: The HLR/HSS-1 reports congestion state information to the SM.

For example, the congestion state information includes: a GW congestion indication (GW Congestion Indication), for example SGW congestion or PGW congestion, and may further include a UE identifier, an APN identifier, and the like.

Optionally, when the MME and the SM are directly connected, the foregoing 1006 and 1007 may be combined into one step, and the MME directly reports the congestion state information of the gateway device to the SM according to the SM address obtained in 1002 or an SM address configured in the MME.

1008: The SM determines, according to the congestion state information, whether the user equipment meets a network switching condition.

For example, the network switching condition may include at least one of a list of identifiers of user equipments which need to perform network switching, a list of APNs used by user equipments which need to perform network switching, and a list of identifiers of services requested by user equipments which need to perform network switching. In this step, for example, the SM may determine, according to a UE identifier carried in the congestion state information, whether the UE identifier is in the user equipment identifier list; and if the UE identifier is in the user equipment identifier list, it indicates that the UE meets the network switching condition; otherwise, it indicates that the UE does not meet the network switching condition.

1009: The SM activates subscription data, in an MN2, of the UE.

For a specific activation process, reference may be made to step 806, which is not described in detail in this embodiment again.

1010: The SM returns a network switching indication, which is used for instructing the UE to switch to the MN2, to the HLR/HSS-1.

1011: The HLR/HSS-1 sends the network switching indication to the MME.

For example, the HLR/HSS-1 sends an update location acknowledge (Update Location Ack) or a notification response to the MME, where the message includes the network switching indication.

Optionally, when the MME and the SM are directly connected, the foregoing 1010 and 1011 may be combined into one step, that is, the SM directly sends a notification response to the MME, to send the network switching indication to the MME.

1012: The MME sends a PDN connectivity reject message carrying the network switching indication to the UE.

1013: The UE completes switching to the MN2 according to received related information of the MN2.

In this embodiment, the gateway device is congested, and the HLR/HSS receives the congestion reporting indication of the SM but sends the indication to the MME; and after the MME receives the congestion notification of the gateway device, the MME is responsible for reporting a congestion state of the gateway device to the SM.

The MME, the SGW, and the PGW in this embodiment are core network devices in an LTE network, and this embodiment is also applicable to other mobile networks. In a 2G/3G network, the MME is replaced by an SGSN, and the PGW is replaced by a GGSN, where the SGSN may be connected to the PGW through the SGW or the SGSN may be directly connected to the GGSN; correspondingly, an eNodeB in the flowchart is replaced by a BSC or an RNC in the 2G/3G network.

In addition, optionally, in this embodiment, the PDN connectivity establishment process is initiated for the UE, and the idea of this embodiment is also applicable to another process of establishing a default bearer, which includes:

For example, in the case of LTE access, a default bearer is established in an Attach process. For example, a UE sends an Attach Request message to an MME, and the MME sends an Attach Reject message to the UE. For another example, in the case of 2G/3G access, an UE initiates a PDP context activation procedure; and in this case, the UE sends an Activate PDP Context Request message to the SGSN, and the SGSN sends an Activate PDP Context Reject message to the UE.

The foregoing optional manners are also applicable to the following two embodiments (Embodiment 9 and Embodiment 10), and are not described repeatedly.

Embodiment 10

Figure 11:
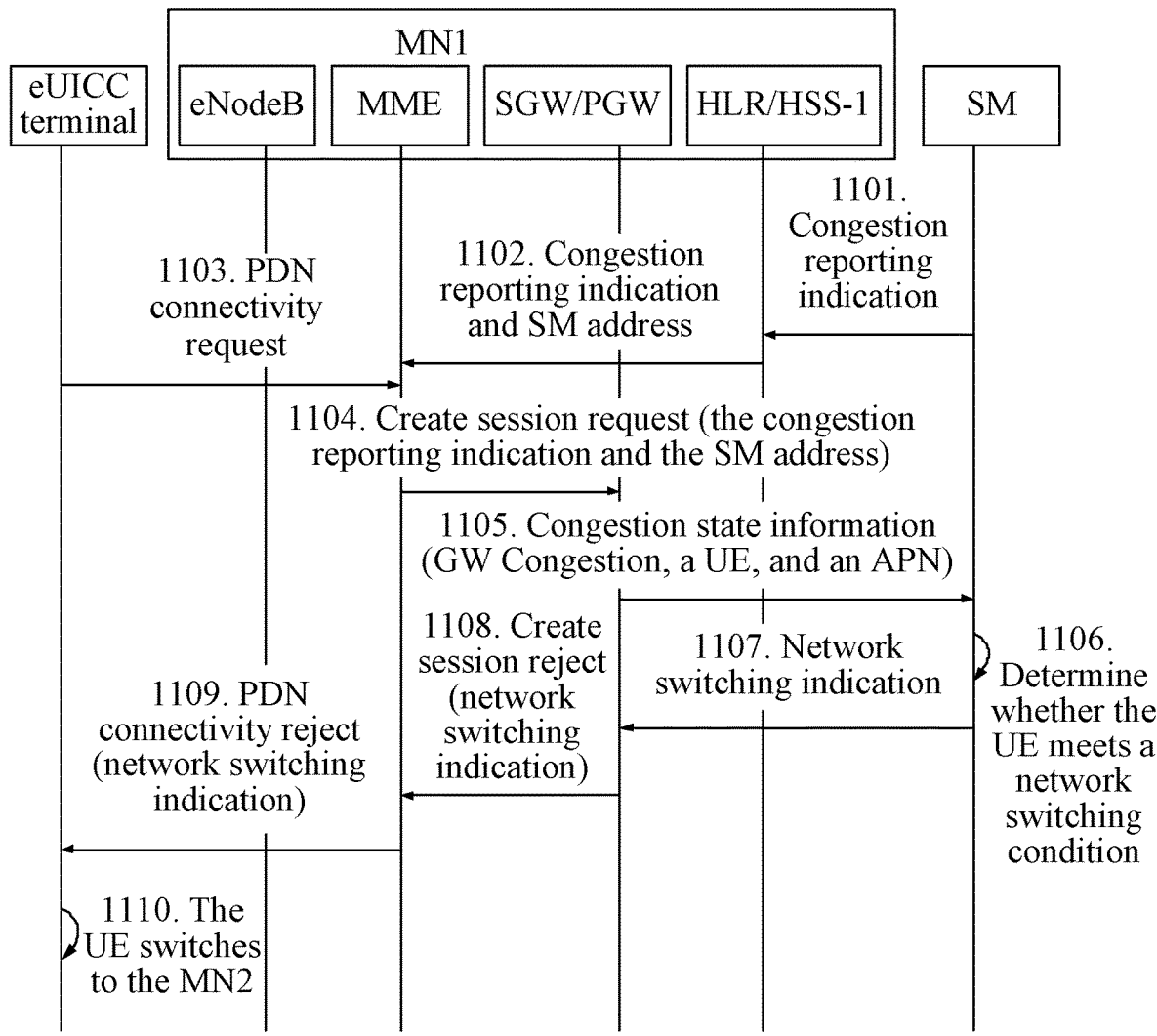
FIG. 11 is a schematic signaling diagram of still another embodiment of the congestion control method according to the present invention.

FIG. 11 is a schematic signaling diagram of still another embodiment of the congestion control method according to the present invention. This embodiment still uses that an SGW or a PGW in an MN1 is congested as an example, but a difference between this embodiment and the foregoing embodiment lies in that in this embodiment, an MME sends an SM address to a gateway device, and the gateway device reports congestion state information to an SM.

As shown in FIG. 11, the method in this embodiment includes:

1101 to 1103 are identical with 1001 to 1003 respectively.

1104: The MME sends a create session request message to the SGW/PGW, and sends the congestion reporting indication and the address information of the SM to the SGW/PGW.

1105: The SGW/PGW reports congestion state information to the SM.

For example, when the PGW is congested, the PGW sends a notification request carrying congestion state information to the SM according to the congestion reporting indication and the address information of the SM. The congestion state information may include: an UE identifier, for example, an IMSI, or an identifier of a service of the UE; a GW congestion indication, for example, PGW congestion; and/or APN information, and so on.

When the SGW is congested, the SGW may send a notification request carrying congestion state information to the SM according to the congestion reporting indication and the address information of the SM; or the SGW may send the congestion reporting indication to the PGW, so as to instruct the PGW to send a notification request (Notification Request) carrying congestion state information to the SM. The congestion state information may include: an UE identifier, for example, an IMSI, or an identifier of a service of the UE; a GW congestion indication, for example, PGW congestion; and/or APN information, and so on.

It should be noted that in the embodiment of the present invention, the MME and the HLR/HSS store the UE identifier, the APN, and the like, and can directly perform reporting; and the SGW/PGW may receive the foregoing information from the MME.

1106: The SM determines whether the user equipment meets a network switching condition.

It is assumed in this embodiment that the SM determines that the user equipment meets the network switching condition and a new mobile network MN2 needs to be selected for the UE; and subscription data, in the MN2, of the UE is already activated, and the SM does not need to activate the data in the MN2; therefore, the SM continues to perform 1107.

1107: The SM returns a network switching indication, which is used for instructing the UE to switch to the MN2, to the SGW/PGW.

For example, the SM sends, to the SGW/PGW, a Notification Response carrying mobile network information Subscription profile, in the MN2, of the UE and a network switching indication (MN Switch). Optionally, when the mobile network information in the MN2 is already preconfigured in the UE, the mobile network information in the MN2 does not need to be included; in this case, the SM includes a MN Switch indication in the message, so as to instruct the UE to activate the mobile network information of the MN2 and switch to the mobile network MN2.

1108: The SGW/PGW (SGW or PGW) sends a create session reject carrying the network switching indication information to the MME.

For example, if network switching does not need to be performed, an existing process may be performed in this step; or if network switching needs to be performed, the network switching indication information included in the create session reject may include the foregoing mobile network information Subscription profile and the network switching indication (MN Switch).

1109: The MME sends a PDN connectivity reject message carrying the network switching indication to the UE.

1110: The UE completes switching to the MN2 according to received related information of the MN2.

Embodiment 11

Figure 12:
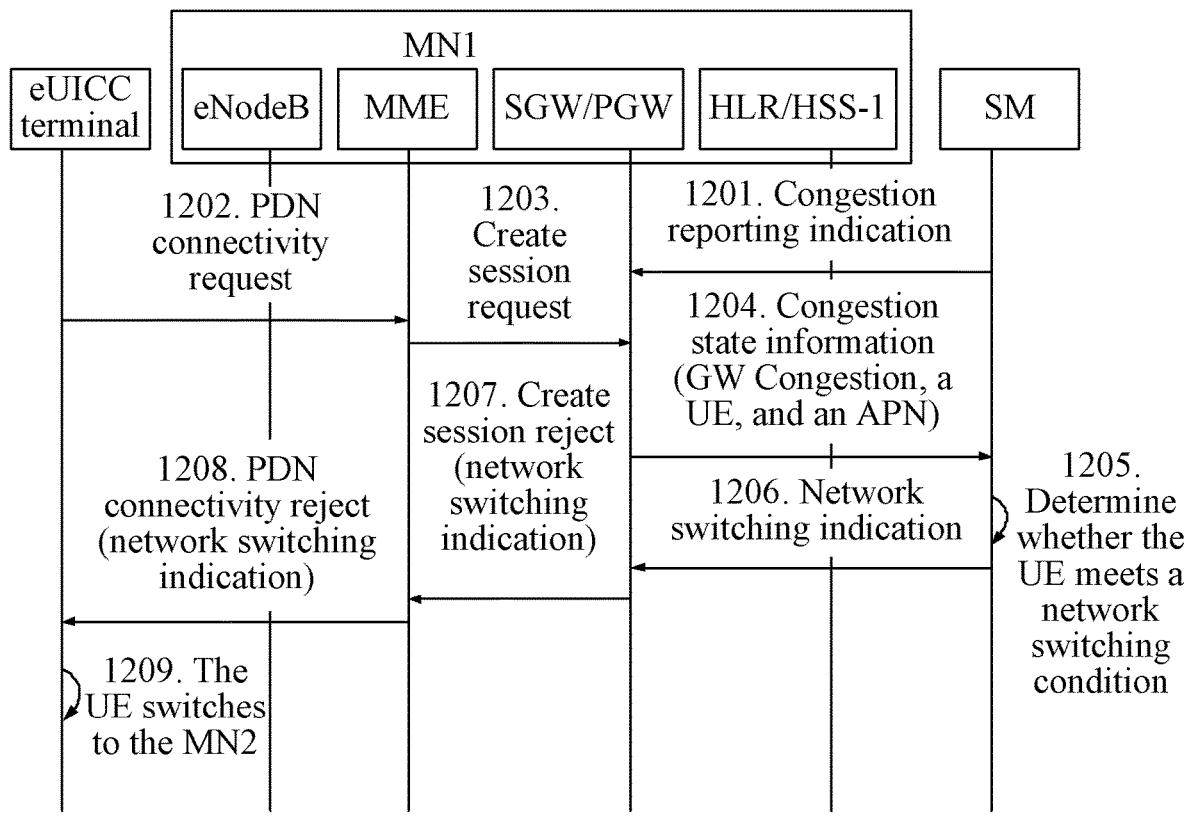
FIG. 12 is a schematic signaling diagram of still another embodiment of the congestion control method according to the present invention.

FIG. 12 is a schematic signaling diagram of still another embodiment of the congestion control method according to the present invention. This embodiment still uses that an SGW or a PGW in an MN1 is congested as an example, but a difference between this embodiment and the foregoing embodiment lies in that in this embodiment, an SM directly sends a congestion reporting indication to a gateway device, and the gateway device directly reports congestion state information of the gateway device to the SM.

As shown in FIG. 12, the method may include:

1201: An SM sends subscription data including a congestion reporting indication (Congestion Action) to an SGW and/or a PGW of an MN1.

Optionally, the processing of the SM sending the subscription data to the SGW and/or the PGW of the MN1 may be that the SM directly sends the subscription data to the SGW and/or the PGW, or may be that the SM sends the subscription data to an PCRF, and the PCRF sends the subscription data to the SGW and/or the PGW, or the PCRF sends the subscription data to the PGW, and the PGW further sends the subscription data to the SGW.

1202: A UE sends a PDN connectivity request message to an MME, to establish a default bearer for a new PDN connection.

1203: The MME sends a create session request to the SGW/PGW.

1204: The SGW/PGW reports congestion state information to the SM.

For example, when the SGW/PGW is congested, the SGW/PGW sends a notification request carrying congestion state information to the SM according to the congestion reporting indication and address information of the SM. The congestion state information may include: an UE identifier, for example, an IMSI, or an identifier of a service of the UE; a GW congestion indication, for example, SGW congestion or PGW congestion; and/or APN information, and so on.

1205: The SM determines whether the UE meets a network switching condition.

It is assumed in this embodiment that the SM determines that the UE meets the network switching condition and a new mobile network MN2 needs to be selected for the UE; and subscription data, in the MN2, of the UE is already activated, and the SM does not need to activate the data in the MN2; therefore, the SM continues to perform 1206.

1206: The SM returns a network switching indication to the SGW/PGW.

1207: The SGW/PGW (SGW or PGW) sends a create session reject carrying the network switching indication information to the MME.

1208: The MME sends a PDN connectivity reject (PDN Connectivity Reject) message carrying the network switching indication to the UE.

1209: The UE completes switching to the MN2 according to received related information of the MN2.

According to the embodiment of the present invention, if a serving network of a UE (for example, a machine user equipment) with an eUICC installed therein is congested, an SM instructs, according to a congestion state of the network and a service which the UE needs to perform, the UE to select a new serving network, so that when the current service is of a high priority and great importance, the UE can access a new mobile network, thereby ensuring smooth implementation of an important service.

Embodiment 12

Figure 13:
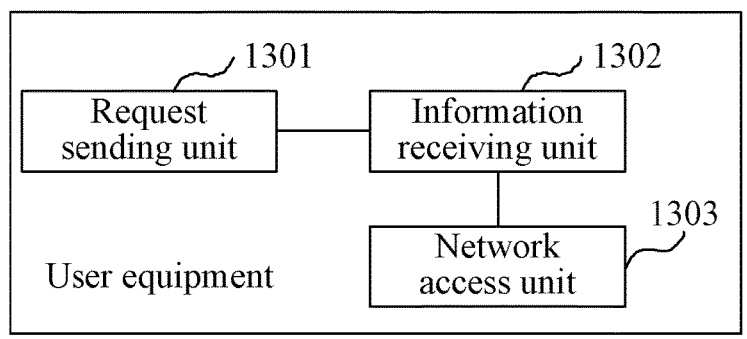
FIG. 13 is a schematic structural diagram of an embodiment of a user equipment according to the present invention.

FIG. 13 is a schematic structural diagram of an embodiment of a user equipment according to the present invention. The user equipment can execute the method according to any one of the embodiments of the present invention. As shown in FIG. 13, the user equipment may include: a request sending unit 1301, an information receiving unit 1302, and a network access unit 1303, where the request sending unit 1301 is configured to send a first network connection request to a network device of a first mobile network;

the information receiving unit 1302 is configured to receive a first network connection rejection message from the network device, where the first network connection rejection message includes network switching indication information, where the network switching indication information is used for instructing the user equipment to switch to a second mobile network, and the network switching indication information is from a subscription manager SM; and the network access unit 1303 is configured to access the second mobile network according to the network switching indication information.

Further, the first network connection request sent by the request sending unit 1301 is an attach request, and the first network connection rejection message received by the information receiving unit 1302 is an attach reject; or the first network connection request sent by the request sending unit 1301 is a PDN connectivity request, and the first network connection rejection message received by the information receiving unit 1302 is a PDN connectivity reject message.

Further, the network switching indication information received by the information receiving unit 1302 is sent after the subscription manager SM receives congestion state information from the first mobile network and determines that the UE needs to perform network switching.

Further, the congestion state information includes information indicating that the first mobile network is congested, and an identifier of the user equipment, or an APN used by the user equipment, or an identifier of a service requested by the user equipment.

Further, the first network connection rejection message received by the information receiving unit 1302 further includes second mobile network information corresponding to the second mobile network; the accessing the second mobile network includes: accessing the second mobile network according to the second mobile network information; and the second mobile network information includes at least one of a mobile network type, a mobile network identifier, and a mobile network index, where the mobile network index is used for indicating the mobile network type and/or the mobile network identifier stored in the user equipment.

Embodiment 13

Figure 14:
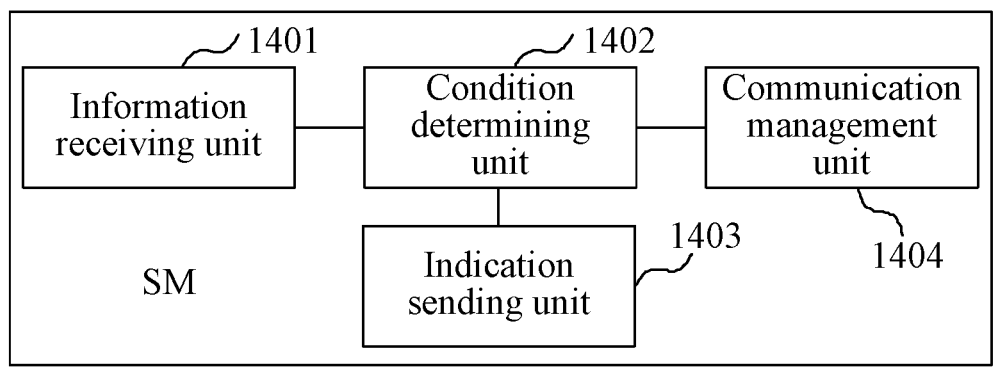
FIG. 14 is a schematic structural diagram of an embodiment of a subscription manager according to the present invention.

FIG. 14 is a schematic structural diagram of an embodiment of a subscription manager according to the present invention. The subscription manager SM can execute the method according to any one of the embodiments of the present invention. As shown in FIG. 14, the SM may include: an information receiving unit 1401, a condition determining unit 1402, and an indication sending unit 1403, where the information receiving unit 1401 is configured to receive congestion state information sent by a network device of a first mobile network, where the congestion state information is used for indicating that the first mobile network is congested, and the congestion state information includes information of a user equipment;

the condition determining unit 1402 is configured to determine, according to the congestion state information, that the user equipment meets a network switching condition; and the indication sending unit 1403 is configured to send network switching indication information to the network device, where the network switching indication information is used for instructing the user equipment to access a second mobile network.

Further, the information of the user equipment received by the information receiving unit 1401 includes at least one of an identifier of the user equipment, an APN used by the user equipment, and an identifier of a service requested by the user equipment.

Further, the network switching condition used by the condition determining unit 1402 for determining includes at least one of a list of identifiers of user equipments which need to perform network switching, a list of APNs used by user equipments which need to perform network switching, and a list of identifiers of services requested by user equipments which need to perform network switching.

Further, the indication sending unit 1403 is further configured to send a congestion reporting indication to the network device, where the congestion reporting indication is used for instructing the first mobile network to send, when the first mobile network is congested, the congestion state information.

Further, the congestion reporting indication includes a congestion reporting condition. For example, the congestion reporting condition includes at least one of a list of user equipment identifiers which needs to be reported when congestion occurs, a list of APNs used by user equipments which needs to be reported when congestion occurs, and a list of identifiers of services requested by user equipments which needs to be reported when congestion occurs.

Further, the SM may further include a communication management unit 1404, configured to communicate with a home subscription server of the second mobile network, to activate subscription data, in the second mobile network, of the user equipment.

Further, the network switching indication information sent by the indication sending unit includes information of the second mobile network. For example, the information of the second mobile network includes at least one of a mobile network type, a mobile network identifier, and a mobile network index, where the mobile network index is used for indicating the mobile network type and/or the mobile network identifier stored in the user equipment.

Embodiment 14

Figure 15:
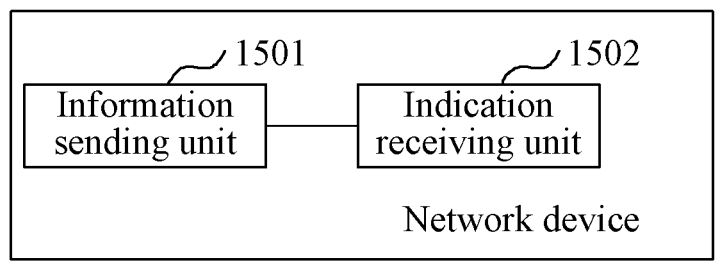
FIG. 15 is a schematic structural diagram of an embodiment of a network device according to the present invention.

A network device in this embodiment can execute the method according to any one of the methods of the present invention. FIG. 15 is a schematic structural diagram of an embodiment of the network device according to the present invention. As shown in FIG. 15, the network device may include an information sending unit 1501 and an indication receiving unit 1502, where the information sending unit 1501 is configured to send congestion state information to a subscription manager SM, where the congestion state information is used for indicating that a first mobile network in which the network device is located is congested, and the congestion state information includes information of a user equipment UE; and the indication receiving unit 1502 is configured to receive network switching indication information from the SM, where the network switching indication information is used for instructing the user equipment to access a second mobile network.

Further, the information of the UE sent by the information sending unit 1501 includes at least one of an identifier of the UE, an APN used by the UE, and an identifier of a service requested by the UE.

Further, the indication receiving unit 1502 is further configured to receive a congestion reporting indication from the SM, where the congestion reporting indication is used for instructing the first mobile network to send, when the first mobile network is congested, the congestion state information.

Further, the congestion reporting indication includes a congestion reporting condition, and the user equipment meets the congestion reporting condition.

Further, that the user equipment meets the congestion reporting condition includes that the identifier of the user equipment is in a user equipment identifier list which is included in the congestion reporting condition and needs to be reported; or the APN used by the user equipment is in an APN list which is included in the congestion reporting condition and needs to be reported; or the identifier of the service requested by the user equipment is in a service identifier list which is included in the congestion reporting condition and needs to be reported.

Figure 16:
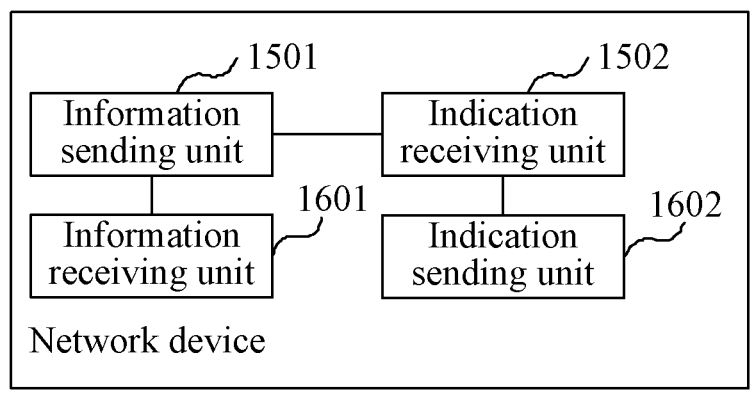
FIG. 16 is a schematic structural diagram of another embodiment of the network device according to the present invention.

FIG. 16 is a schematic structural diagram of another embodiment of the network device according to the present invention. For example, the network device may be an HSS or an HLR. As shown in FIG. 16, based on the structure shown in FIG. 15, the network device further includes an information receiving unit 1601 and an indication sending unit 1602, where the information receiving unit 1601 is configured to receive congestion indication information sent by a mobility management entity MME of the first mobile network, where the congestion state information is sent after the congestion indication information sent by the MME is received, and the congestion state information is used for indicating that the MME in the first mobile network is congested; and the indication sending unit 1602 is configured to send the network switching indication information to the MME.

Further, the indication sending unit 1602 is further configured to send a congestion reporting indication to the mobility management entity MME of the first mobile network, where the reporting indication is used for instructing the MME to send, when the first mobile network is congested, congestion state information; and the information receiving unit 1601 is further configured to receive the congestion state information sent by the MME, where the congestion state information indicates that the MME is congested or an SGW is congested or a PGW is congested.

Figure 17:
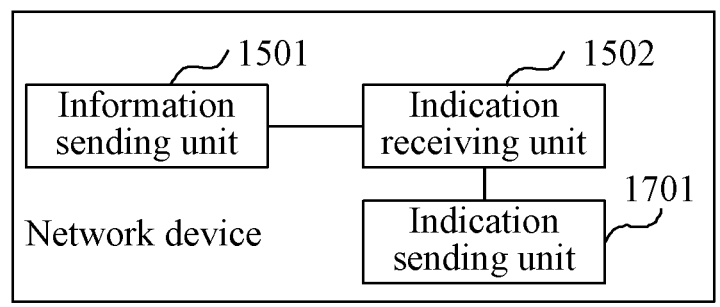
FIG. 17 is a schematic structural diagram of still another embodiment of the network device according to the present invention.

FIG. 17 is a schematic structural diagram of still another embodiment of the network device according to the present invention. For example, the network device may be a PGW or an SGW. As shown in FIG. 17, based on the structure shown in FIG. 15, the network device further includes an indication sending unit 1701, where the indication receiving unit 1502 is further configured to receive, through an HSS/HLR and an MME, the congestion reporting indication sent by the SM, or receive the congestion reporting indication directly from the SM; and the indication sending unit 1701 is configured to send the network switching indication information to the MME.

Further, the congestion state information indicates that the PGW or the SGW is congested.

Figure 18:
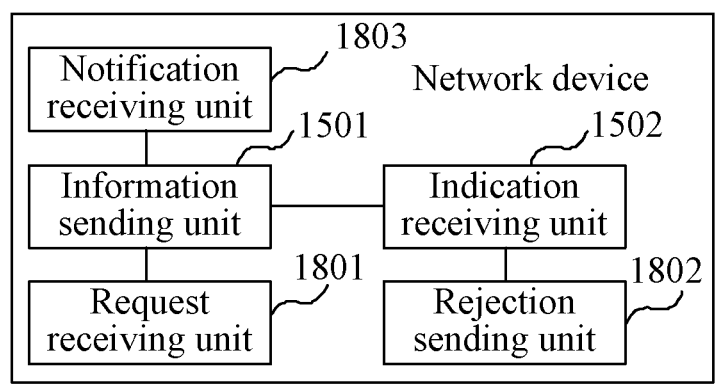
FIG. 18 is a schematic structural diagram of still another embodiment of the network device according to the present invention.

FIG. 18 is a schematic structural diagram of still another embodiment of the network device according to the present invention. For example, the network device is an MME. As shown in FIG. 18, based on the structure shown in FIG. 15, the network device may further include a request receiving unit 1801 and a rejection sending unit 1802, where the request receiving unit 1801 is configured to receive a first network connection request from the UE; and the rejection sending unit 1802 is configured to send the UE a first network connection rejection message including the network switching indication information.

For example, the first network connection request received by the request receiving unit 1801 is an attach request, and the first network connection rejection message sent by the rejection sending unit 1802 is an attach reject; or the first network connection request received by the request receiving unit 1801 is a PDN connectivity request, and the first network connection rejection message sent by the rejection sending unit 1802 is a PDN connectivity reject message.

Further, the indication receiving unit 1502 is further configured to receive, through an HSS/HLR, the congestion reporting indication sent by the SM; and the congestion state information sent by the information sending unit 1501 is sent to the SM through the HLR/HSS.

Further, the congestion state information indicates that the MME is congested.

Further, the network device may further include a notification receiving unit 1803, configured to receive a congestion notification from an SGW; and the congestion state information sent by the information sending unit 1501 indicates that the SGW or a PGW is congested.

In the network device provided in the embodiment of the present invention, the network switching indication information includes information of the second mobile network. For example, the information of the second mobile network includes at least one of a mobile network type, a mobile network identifier, and a mobile network index, where the mobile network index is used for indicating the mobile network type and/or the mobile network identifier stored in the user equipment.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A congestion control method, comprising:
receiving, by a subscription manager (SM), congestion state information from a network device of a first mobile network, wherein the congestion state information is used for indicating that the first mobile network is congested, and the congestion state information comprises information of a user equipment (UE);

determining, by the SM according to the congestion state information, that the UE meets a network switching condition;

sending, by the SM, network switching indication information to the network device, wherein the network switching indication information is used for instructing the user equipment to access a second mobile network; and receiving, by the network device, a congestion reporting indication from the SM, wherein the congestion reporting indication is used for instructing the first mobile network to send, when the first mobile network is congested, the congestion state information.

2. The method according to claim 1, wherein the information of the UE comprises at least one of an identifier of the UE, an access point name (APN) used by the UE, and an identifier of a service requested by the UE.

3. The method according to claim 1, wherein the congestion reporting indication comprises a congestion reporting condition, and the user equipment meets the congestion reporting condition.

4. The method according to claim 3, wherein that the user equipment meets the congestion reporting condition comprises:
an identifier of the user equipment is in a user equipment identifier list which is comprised in the congestion reporting condition and needs to be reported; or
an access point name (APN) used by the user equipment is in an APN list which is comprised in the congestion reporting condition and needs to be reported, or
an identifier of a service requested by the user equipment is in a service identifier list which is comprised in the congestion reporting condition and needs to be reported.

5. The method according to claim 1, wherein the network switching indication information comprises information of the second mobile network.

6. The method according to claim 5, wherein the information of the second mobile network comprises at least one of a mobile network type, a mobile network identifier, and a mobile network index, wherein the mobile network index is used for indicating the mobile network type and/or the mobile network identifier stored in the user equipment.

7. A system for congestion control, comprising a network device of a first mobile network and a subscription manager (SM),
the network device, configured to send congestion state information to the SM, wherein the congestion state information is used for indicating that the first mobile network is congested, and the congestion state information comprises information of a user equipment (UE);
the SM, configured to receive the congestion state information;
the SM, configured to determine, according to the congestion state information, that the UE meets a network switching condition; and
the SM, configured to send network switching indication information to the network device, wherein the network switching indication information is used for instructing the user equipment to access a second mobile network;
the network device, configured to receive the network switching indication information from the SM; and
the network device, configured to receive a congestion reporting indication from the SM, wherein the congestion reporting indication is used for instructing the first mobile network to send, when the first mobile network is congested, the congestion state information.

8. The system according to claim 7, wherein the information of the UE comprises at least one of an identifier of the UE, an access point name (APN) used by the UE, and an identifier of a service requested by the UE.

9. The system according to claim 7, wherein the congestion reporting indication comprises a congestion reporting condition, and the user equipment meets the congestion reporting condition.

10. The system according to claim 9, wherein that the user equipment meets the congestion reporting condition comprises:
    an identifier of the user equipment is in a user equipment identifier list which is comprised in the congestion reporting condition and needs to be reported; or
    an access point name (APN) used by the user equipment is in an APN list which is comprised in the congestion reporting condition and needs to be reported, or
    an identifier of a service requested by the user equipment is in a service identifier list which is comprised in the congestion reporting condition and needs to be reported.

11. The system according to claim 7, wherein the network switching indication information comprises information of the second mobile network.

12. The system according to claim 11, wherein the information of the second mobile network comprises at least one of a mobile network type, a mobile network identifier, and a mobile network index, wherein the mobile network index is used for indicating the mobile network type and/or the mobile network identifier stored in the user equipment.

* * * * *